(12) United States Patent
Yata

(10) Patent No.: US 10,657,908 B2
(45) Date of Patent: May 19, 2020

(54) DISPLAY DEVICE AND METHOD OF DRIVING THE SAME

(71) Applicant: Japan Display Inc., Tokyo (JP)

(72) Inventor: Tatsuya Yata, Tokyo (JP)

(73) Assignee: Japan Display Inc., Tokyo (JP)

( * ) Notice: Subject to any disclaimer, the term of this patent is extended or adjusted under 35 U.S.C. 154(b) by 98 days.

(21) Appl. No.: 15/651,367

(22) Filed: Jul. 17, 2017

(65) Prior Publication Data
US 2018/0025692 A1   Jan. 25, 2018

(30) Foreign Application Priority Data
Jul. 22, 2016 (JP) .................................. 2016-144719

(51) Int. Cl.
| | |
|---|---|
| *G09G 3/36* | (2006.01) |
| *G02F 1/1335* | (2006.01) |
| *G09G 3/34* | (2006.01) |
| *G02F 1/1333* | (2006.01) |
| *G02F 1/13357* | (2006.01) |

(52) U.S. Cl.
CPC ..... *G09G 3/3607* (2013.01); *G02F 1/133514* (2013.01); *G02F 1/133553* (2013.01); *G02F 1/133621* (2013.01); *G09G 3/3413* (2013.01); *G09G 3/3648* (2013.01); *G02F 2001/133342* (2013.01); *G02F 2001/133618* (2013.01); *G02F 2201/52* (2013.01); *G02F 2202/022* (2013.01); *G02F 2203/03* (2013.01); *G09G 2300/023* (2013.01); *G09G 2300/0413* (2013.01); *G09G 2300/0426* (2013.01); *G09G 2300/0452* (2013.01)

(58) Field of Classification Search
CPC .............................................. G09G 2310/0235
See application file for complete search history.

(56) References Cited

U.S. PATENT DOCUMENTS

| | | | | |
|---|---|---|---|---|
| 5,587,819 A | * | 12/1996 | Sunohara .......... | G02F 1/133514 349/106 |
| 5,903,329 A | * | 5/1999 | Yoshida ............ | G02F 1/133514 349/106 |
| 8,077,374 B2 | * | 12/2011 | Jang ...................... | G02F 1/1334 359/267 |
| 8,089,606 B2 | * | 1/2012 | Han ................... | G02F 1/133553 349/183 |
| 8,593,384 B2 | * | 11/2013 | Yang .................... | G09G 3/3406 345/102 |
| 9,069,208 B2 | * | 6/2015 | Shinkai ................ | G02B 6/0036 |

(Continued)

FOREIGN PATENT DOCUMENTS

| | | |
|---|---|---|
| JP | 11-183902 A | 7/1999 |
| JP | 2013-080646 A | 5/2013 |

*Primary Examiner* — Patrick F Marinelli
(74) *Attorney, Agent, or Firm* — Michael Best & Friedrich LLP

(57) ABSTRACT

According to one embodiment, a display device, includes a display panel having a light transmission property, the display panel includes a first sub-pixel exhibiting a first color, a second sub-pixel exhibiting a second color, a third sub-pixel exhibiting a third color, a dummy pixel exhibiting a fourth color having brightness lower than the first to third colors, and a light modulating layer capable of changing a light transmission property and a light scattering property of regions corresponding to the first to third sub-pixels and the dummy pixel, respectively.

19 Claims, 30 Drawing Sheets

(56) References Cited

U.S. PATENT DOCUMENTS

| Patent/Publication No. | Date | Inventor | Classification |
|---|---|---|---|
| 9,093,042 B2 * | 7/2015 | Park | G09G 3/3648 |
| 9,548,013 B2 * | 1/2017 | Kobayashi | G02F 1/1334 |
| 9,552,782 B2 * | 1/2017 | Kobayashi | G09G 3/3413 |
| 9,620,044 B2 * | 4/2017 | Kobayashi | G09G 3/36 |
| 9,880,412 B2 * | 1/2018 | Guo | G02B 5/201 |
| 9,881,975 B2 * | 1/2018 | Phan | H01L 27/3213 |
| 9,983,437 B2 * | 5/2018 | Okuyama | G02F 1/133615 |
| 2004/0027416 A1 * | 2/2004 | Rosenberger | H04N 1/54 347/43 |
| 2005/0018108 A1 * | 1/2005 | Okumura | G02B 5/201 349/106 |
| 2008/0055519 A1 * | 3/2008 | Battersby | G09G 3/3648 349/68 |
| 2008/0158141 A1 * | 7/2008 | Yoshihara | G09G 3/3413 345/102 |
| 2008/0180617 A1 * | 7/2008 | Wu | G02F 1/133555 349/114 |
| 2009/0051638 A1 * | 2/2009 | Horiuchi | G09G 3/2003 345/88 |
| 2009/0096967 A1 * | 4/2009 | Sung | G02B 26/026 349/114 |
| 2010/0085510 A1 | 4/2010 | Okuyama et al. | |
| 2010/0091221 A1 * | 4/2010 | Han | G02F 1/133553 349/86 |
| 2010/0165450 A1 | 7/2010 | Okuyama et al. | |
| 2010/0182673 A1 * | 7/2010 | Jang | G02F 1/1334 359/270 |
| 2010/0225567 A1 * | 9/2010 | Koebrich | G09G 3/20 345/55 |
| 2011/0096261 A1 * | 4/2011 | Kobayashi | G02F 1/1334 349/42 |
| 2011/0109663 A1 | 5/2011 | Uchida et al. | |
| 2011/0141551 A1 * | 6/2011 | Uchida | G02F 1/1334 359/316 |
| 2011/0169877 A1 * | 7/2011 | Ishida | G02F 1/1334 345/690 |
| 2011/0242146 A1 | 10/2011 | Uchida et al. | |
| 2012/0098875 A1 * | 4/2012 | Shinkai | G02B 6/0036 345/690 |
| 2012/0172485 A1 * | 7/2012 | Sun | A61K 6/0023 522/182 |
| 2012/0274867 A1 | 11/2012 | Shinkai et al. | |
| 2013/0027444 A1 * | 1/2013 | Chui | G02B 26/001 345/694 |
| 2013/0162616 A1 * | 6/2013 | Park | G09G 3/3648 345/211 |
| 2013/0229595 A1 * | 9/2013 | Shinkai | G02F 1/1334 349/62 |
| 2013/0258711 A1 * | 10/2013 | Okuyama | G02B 6/0055 362/611 |
| 2014/0055835 A1 * | 2/2014 | Shinkai | F21V 7/00 359/251 |
| 2014/0240642 A1 | 8/2014 | Furukawa et al. | |
| 2015/0077447 A1 * | 3/2015 | Zhang | G02F 1/167 345/694 |
| 2015/0103107 A1 * | 4/2015 | Kobayashi | G09G 3/3413 345/691 |
| 2015/0109763 A1 | 4/2015 | Shinkai et al. | |
| 2015/0262520 A1 * | 9/2015 | Kobayashi | G02F 1/1334 345/5 |
| 2015/0277164 A1 * | 10/2015 | Nagase | G02F 1/1334 349/33 |
| 2015/0279256 A1 * | 10/2015 | Kobayashi | G09G 3/36 345/694 |
| 2015/0325163 A1 * | 11/2015 | Kobayashi | G02F 1/13476 345/690 |
| 2016/0041424 A1 * | 2/2016 | Guo | G02B 5/201 345/694 |
| 2016/0055821 A1 * | 2/2016 | Phan | G02F 1/133514 345/592 |
| 2016/0070047 A1 * | 3/2016 | Okuyama | G02B 6/005 349/71 |
| 2016/0109740 A1 * | 4/2016 | Lee | G02F 1/13306 345/207 |
| 2016/0111056 A1 * | 4/2016 | Katsuta | G09G 3/3614 345/99 |
| 2016/0116768 A1 | 4/2016 | Okuyama et al. | |
| 2016/0163271 A1 * | 6/2016 | Sakaigawa | G02F 1/1326 345/694 |
| 2016/0180760 A1 * | 6/2016 | Hochman | G09G 3/2003 345/694 |
| 2016/0253940 A1 * | 9/2016 | Wang | G09G 3/20 345/694 |
| 2016/0260401 A1 * | 9/2016 | Sakaigawa | G09G 3/3607 |
| 2016/0275877 A1 * | 9/2016 | Fan | G02F 1/133514 |
| 2016/0284768 A1 * | 9/2016 | Phan | H01L 27/3213 |
| 2017/0031187 A1 | 2/2017 | Douyou | |
| 2017/0186408 A1 * | 6/2017 | Nagayama | G09G 5/391 |
| 2017/0255072 A1 | 9/2017 | Kaneko et al. | |
| 2017/0261809 A1 | 9/2017 | Mizuno et al. | |
| 2017/0308345 A1 * | 10/2017 | He | G06F 3/0346 |
| 2017/0344166 A1 * | 11/2017 | Nam | G06F 3/0416 |
| 2017/0352329 A1 * | 12/2017 | Imai | G09G 5/10 |
| 2018/0011511 A1 * | 1/2018 | Cho | G09G 3/3406 |
| 2018/0011512 A1 * | 1/2018 | Cho | G09G 3/3406 |
| 2018/0024403 A1 * | 1/2018 | Yata | G02F 1/1334 |
| 2018/0025692 A1 * | 1/2018 | Yata | G09G 3/3607 |
| 2018/0130430 A1 * | 5/2018 | Xi | G09G 3/3413 |
| 2018/0130432 A1 * | 5/2018 | Cui | G09G 3/36 |
| 2018/0336851 A1 * | 11/2018 | Hidaka | G09G 3/20 |
| 2019/0043454 A1 * | 2/2019 | Choong | G09G 5/14 |
| 2019/0171045 A1 * | 6/2019 | Masuda | G02F 1/13476 |

* cited by examiner

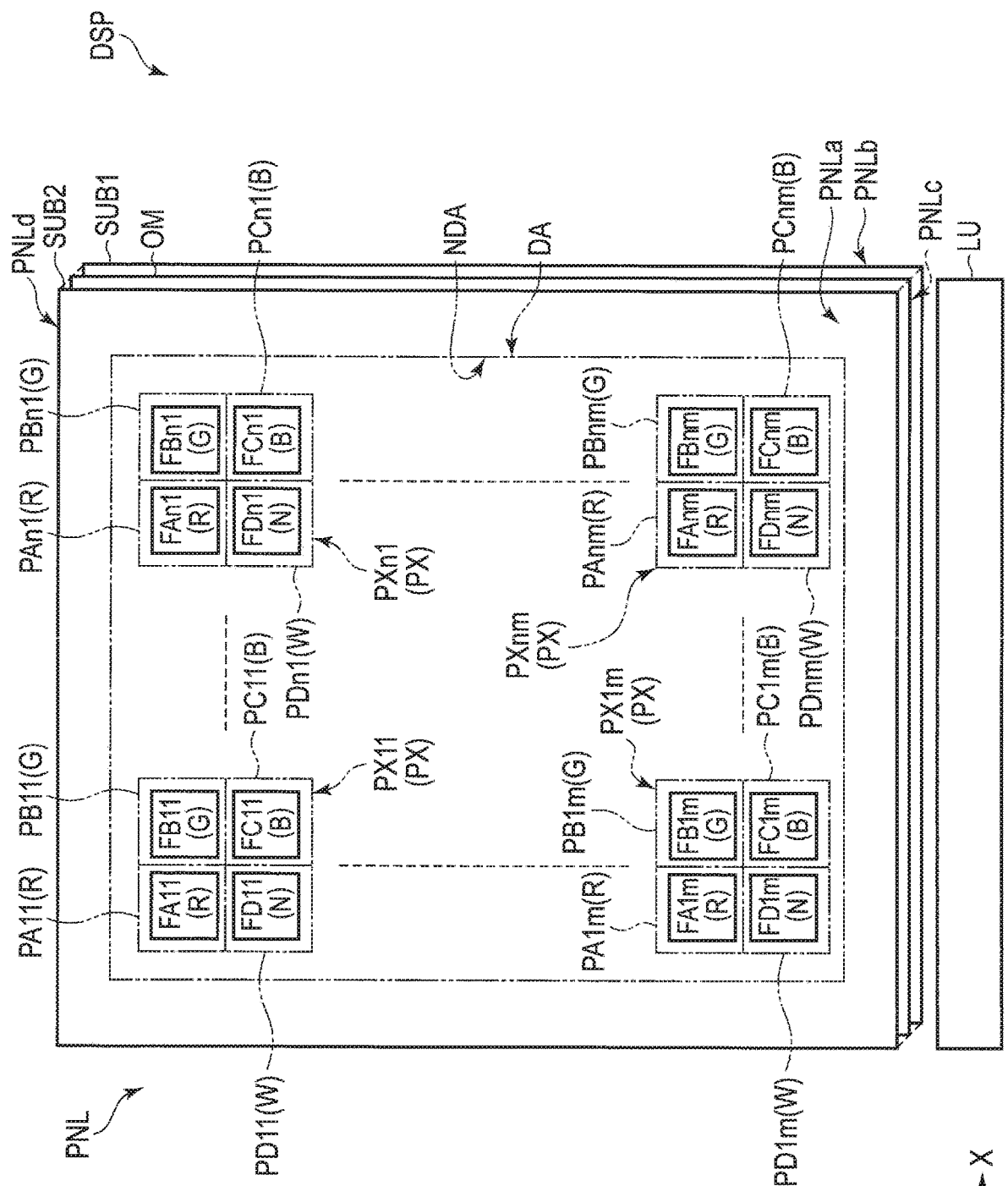
F I G. 1

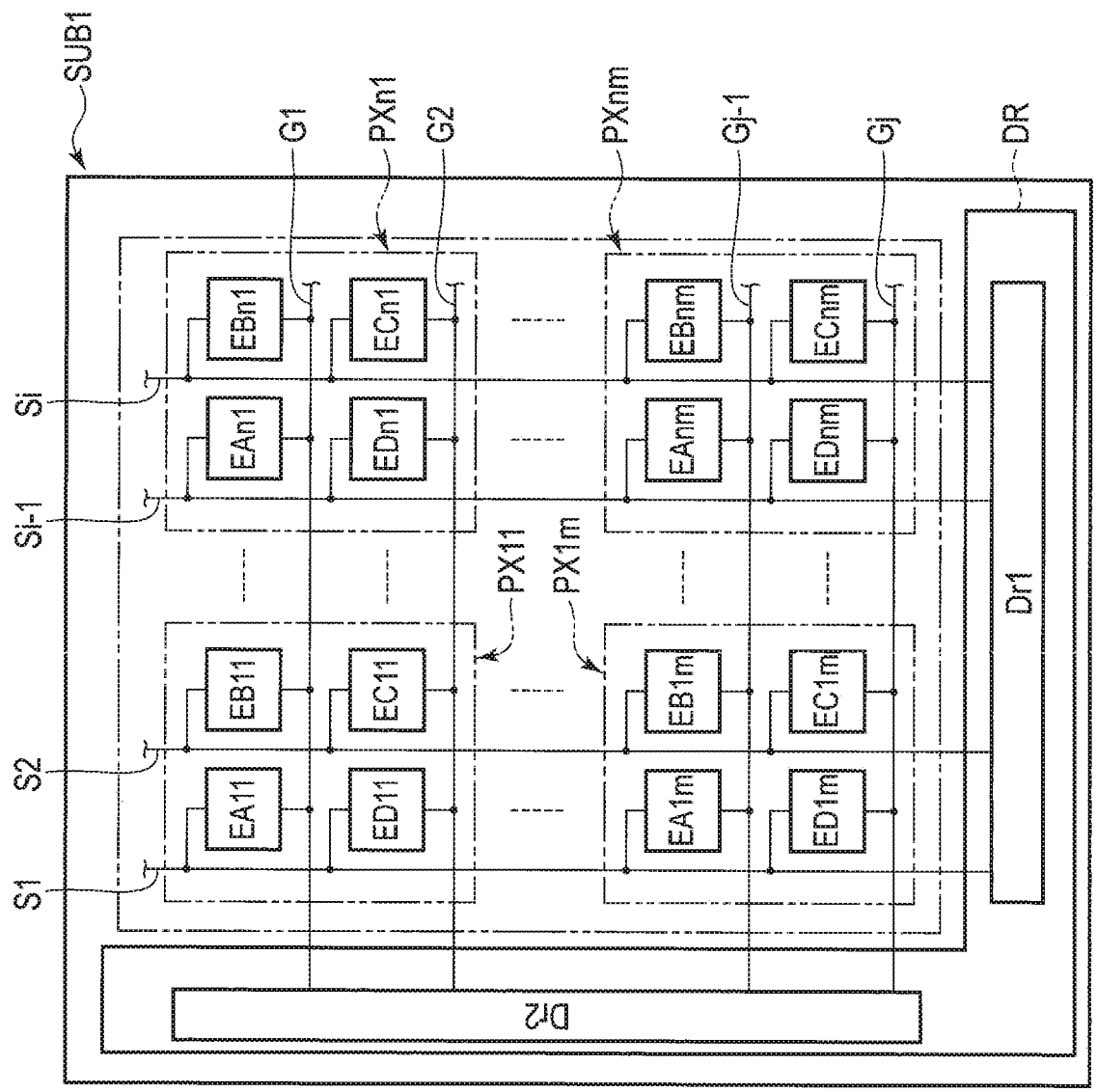
F I G. 2

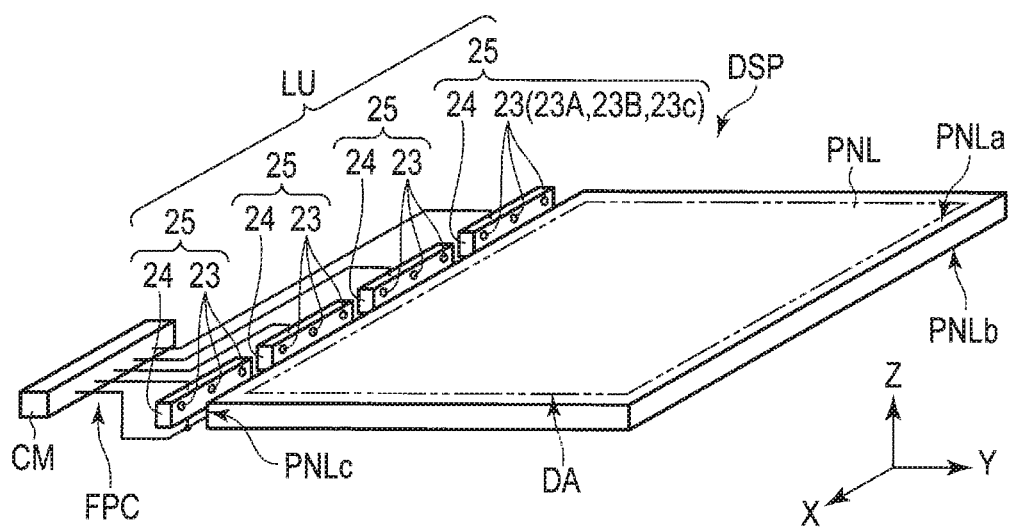
F I G. 6
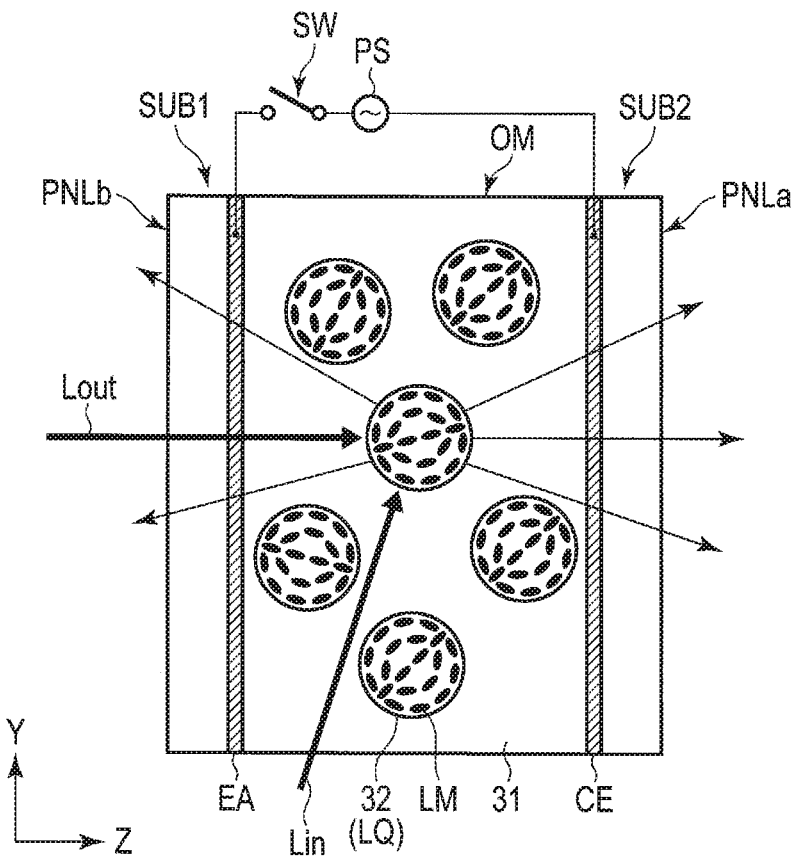
F I G. 7

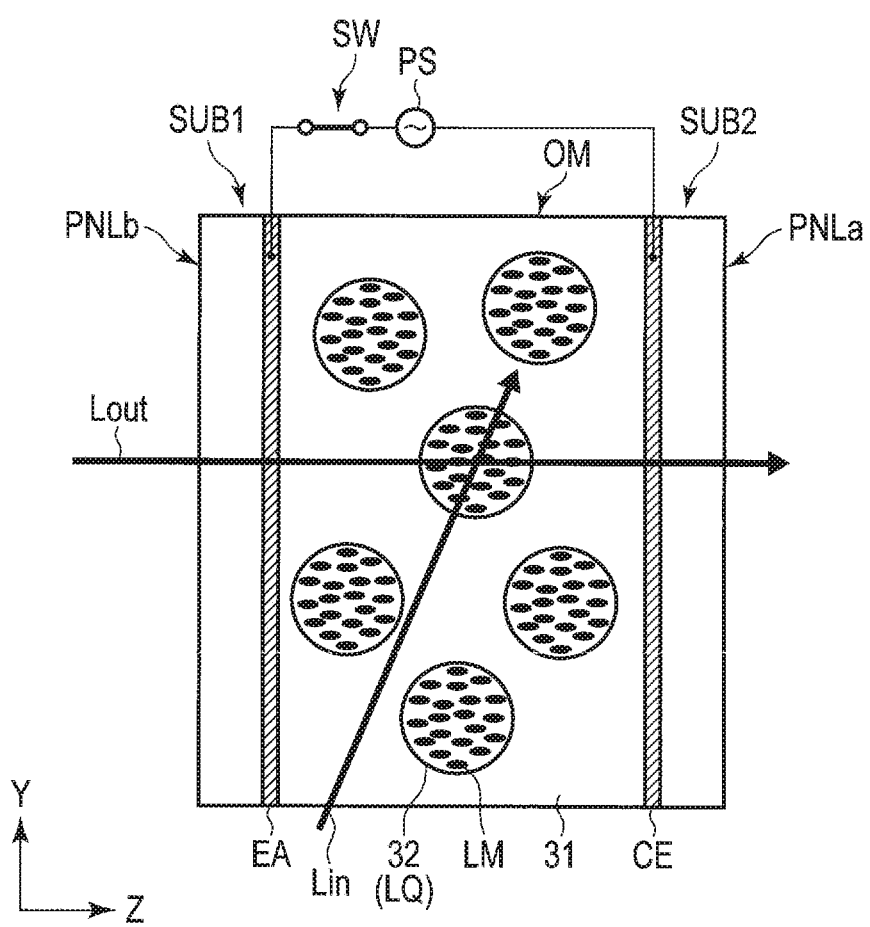
F I G. 8

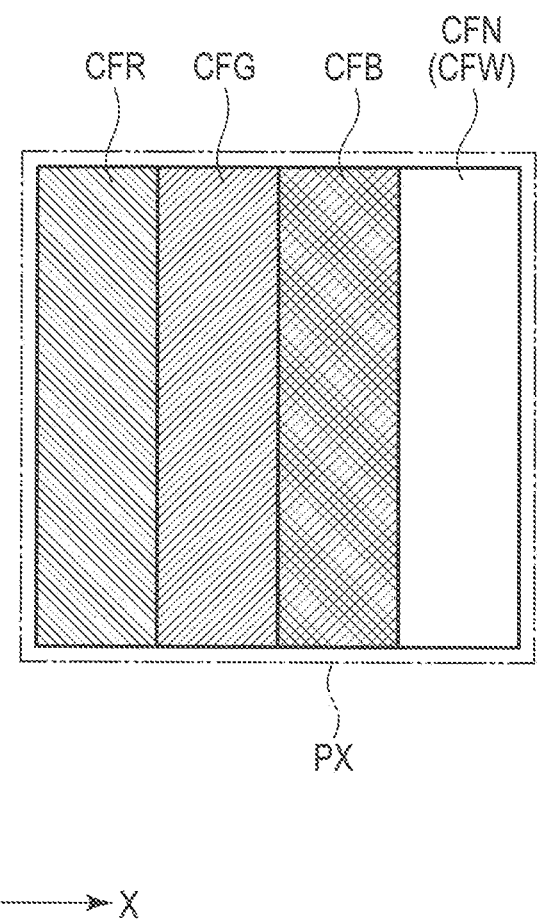
F I G. 15

| | Mode1 | Mode2 | Mode3 |
|---|---|---|---|
| Lout | High | Low | 0 |
| LU (R,G,B) | OFF | ON (Turn on all) | ON (Turn on sequentially) |

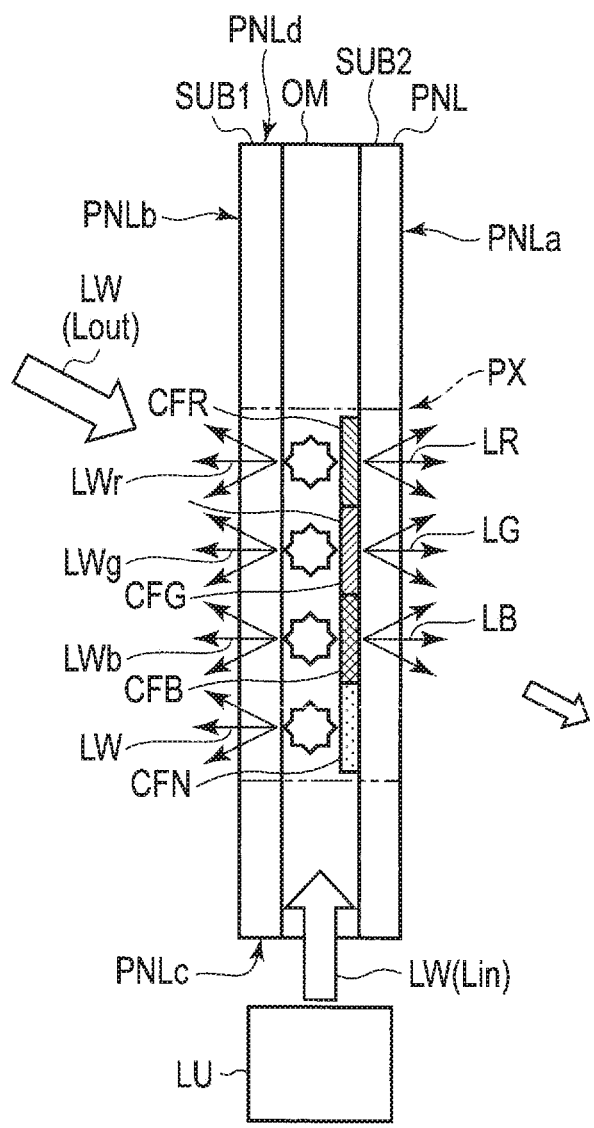
F I G. 20

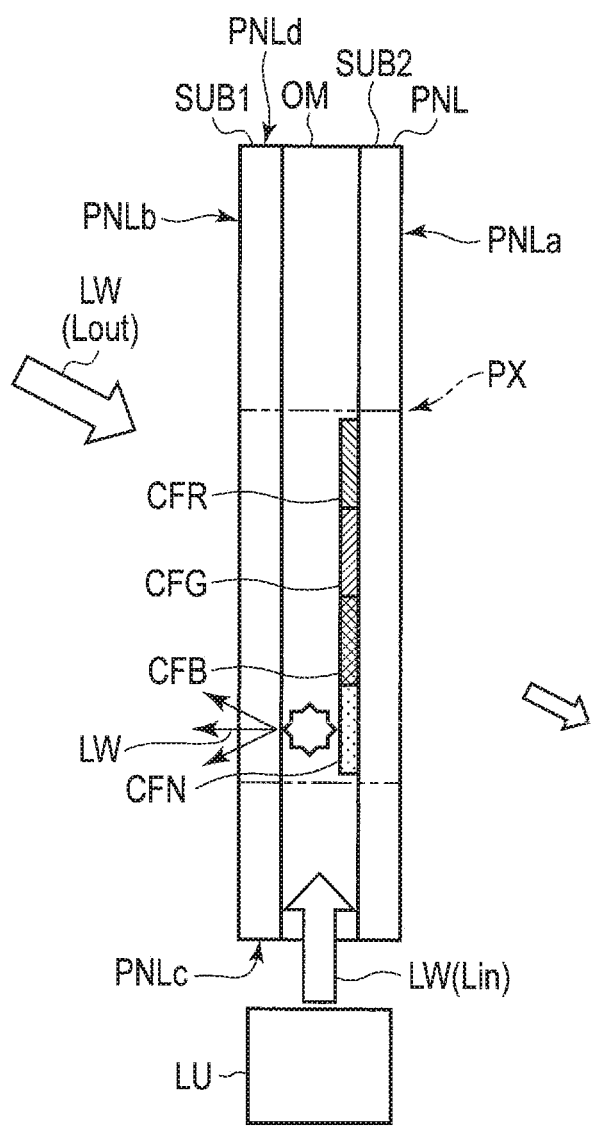
F I G. 21

| Light sources | Color filters | Expression |
|---|---|---|
| Blue | Red | OFF |
| | Green | OFF |
| | Blue | Blue |
| Yellow | Red | Red |
| | Green | Green |
| | Blue | OFF |
| Green | Red | OFF |
| | Green | Green |
| | Blue | OFF |
| Magenta | Red | Red |
| | Green | OFF |
| | Blue | Blue |
| Red | Red | Red |
| | Green | OFF |
| | Blue | OFF |
| Cyan | Red | OFF |
| | Green | Green |
| | Blue | Blue |

FIG. 24

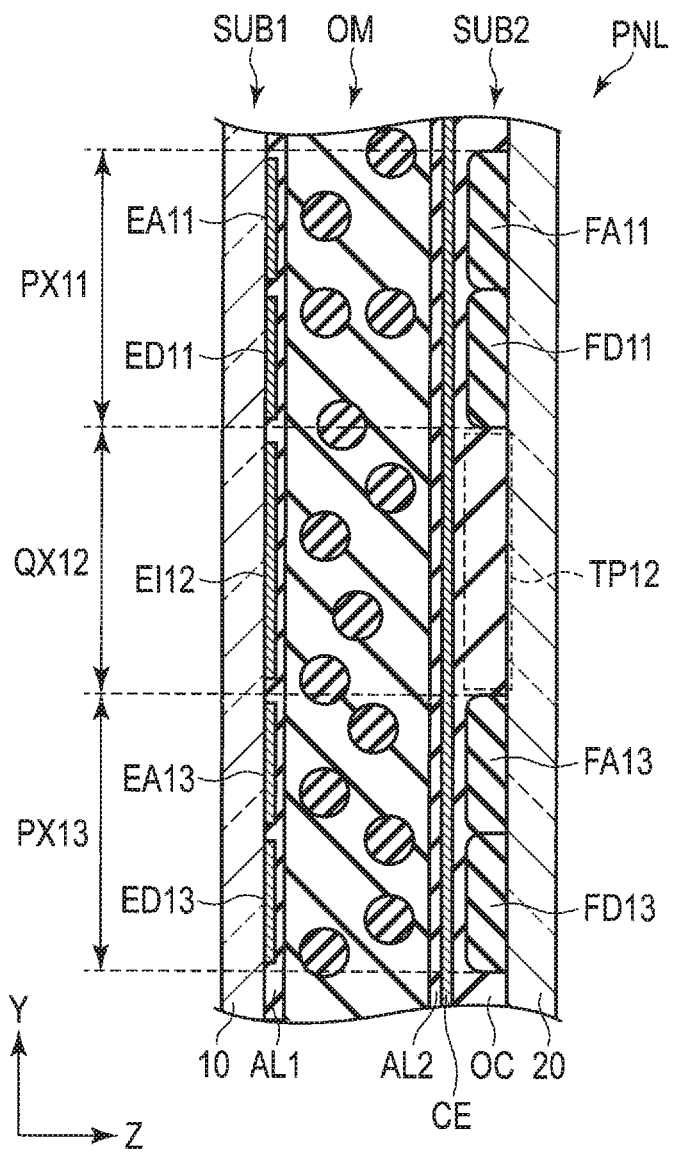
F I G. 29

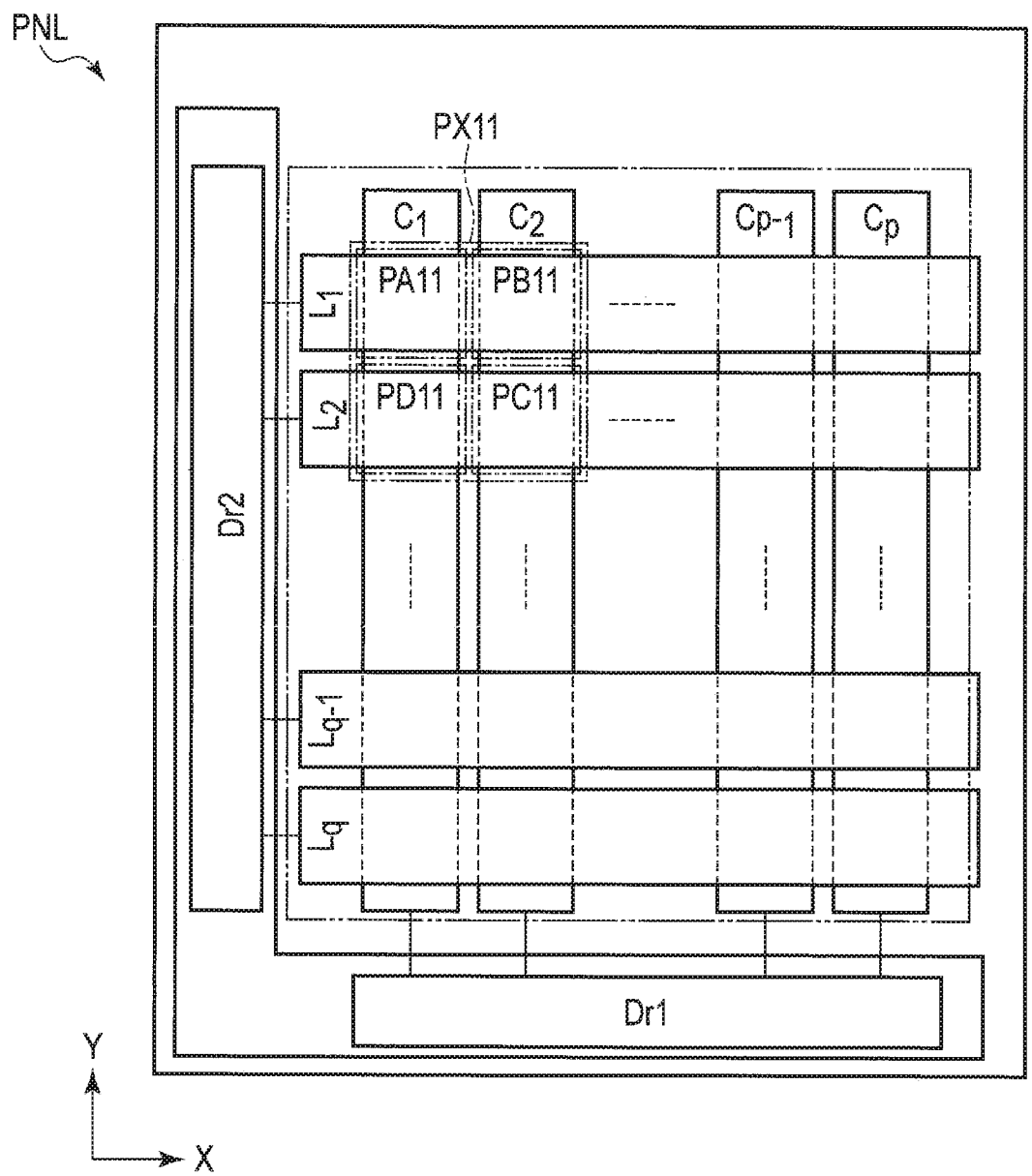
F I G. 31

DISPLAY DEVICE AND METHOD OF DRIVING THE SAME

CROSS-REFERENCE TO RELATED APPLICATIONS

This application is based upon and claims the benefit of priority from Japanese Patent Application No. 2016-144719, filed Jul. 22, 2016, the entire contents of which are incorporated herein by reference.

FIELD

Embodiments described herein relate generally to a display device and a method of driving the same.

BACKGROUND

Transparent displays are display devices which allow an observer to view an opposite side. Various structures of the transparent displays have been considered and, for example, structures comprising a liquid crystal display panel including a polarizing filter, a display panel including spontaneous light-emitting element such as an organic light-emitting diode, and the like have been disclosed. If the transparent display displays an image on one of surfaces, however, an inverted image may be displayed on the other surface.

BRIEF DESCRIPTION OF THE DRAWINGS

FIG. 1 is a diagram showing a configuration example of a display device DSP of a first embodiment.

FIG. 2 is a diagram showing a configuration example of a first substrate SUB1 shown in FIG. 1.

FIG. 6 is an illustration showing a configuration example of a light source unit LU shown in FIG. 1.

FIG. 7 is an illustration showing the display panel PNL in a case where a light modulating layer OM has a scattering property.

FIG. 8 is an illustration showing the display panel PNL in a case where a light modulating layer OM has transparency.

FIG. 15 is an illustration showing a configuration example of the color filters in the main pixel PX.

FIG. 20 is a diagram for explanation of behavior of the display device DSP in the second display mode shown in FIG. 19.

FIG. 21 is a diagram for explanation of behavior of the display device DSP in the second display mode shown in FIG. 19.

FIG. 24 is a table showing colors of light emitted from a light source 23 and colors which can be expressed with the emitted light by the display device DSP.

FIG. 29 is a diagram showing a second modified example of the display device DSP of the present embodiment.

FIG. 31 is a diagram showing a third modified example of the display device DSP of the present embodiment.

DETAILED DESCRIPTION

Figure 3:
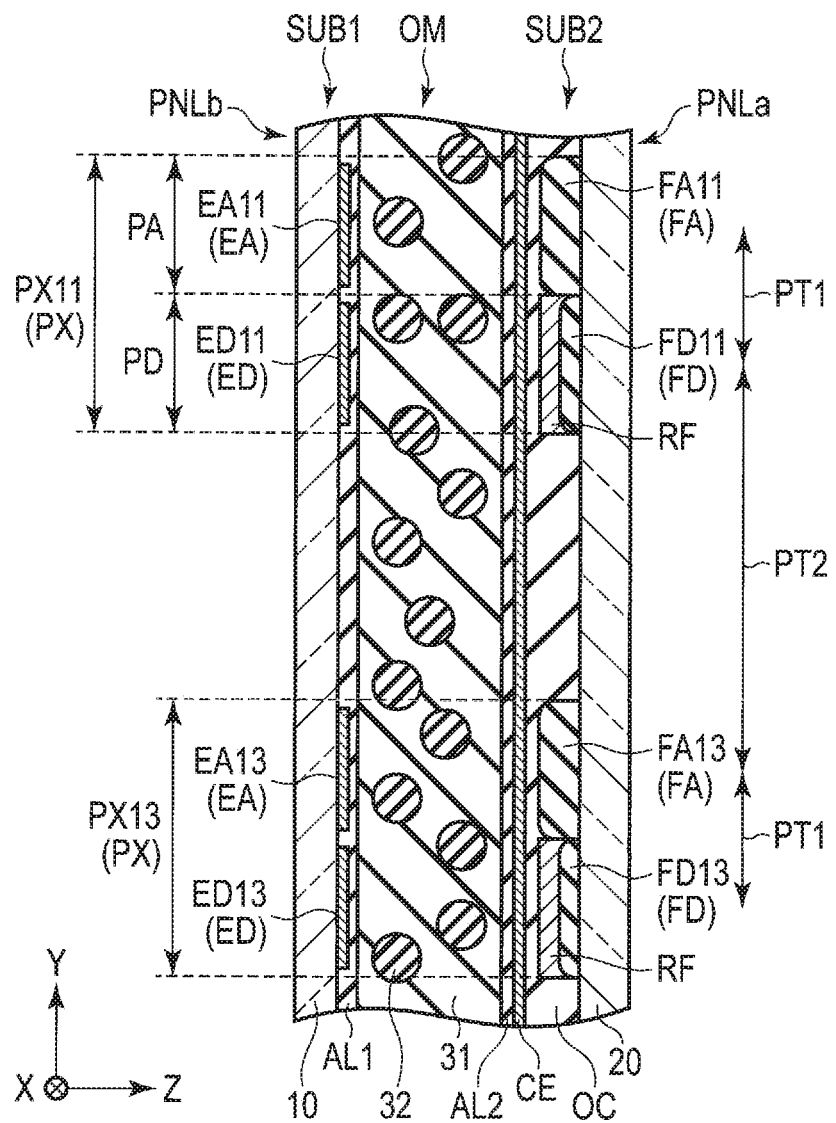
FIG. 3 is a cross-sectional view showing the configuration example of the display panel PNL shown in FIG. 1.

According to one embodiment, a display device, comprising: a display panel having a light transmission property, the display panel comprising: a first sub-pixel exhibiting a first color; a second sub-pixel exhibiting a second color; a third sub-pixel exhibiting a third color; a dummy pixel exhibiting a fourth color having brightness lower than the first to third colors; and a light modulating layer capable of changing a light transmission property and a light scattering property of regions corresponding to the first to third sub-pixels and the dummy pixel, respectively.

According to another embodiment, a method of driving a display device, the display device comprising: a first sub-pixel exhibiting a first color; a second sub-pixel exhibiting a second color; a third sub-pixel exhibiting a third color; a first substrate having a light transmission property; a second substrate opposed to the first substrate and having a light transmission property; a first color filter disposed on the first sub-pixel of the second substrate to allow light of the first color to be transmitted; a second color filter disposed on the second sub-pixel of the second substrate to allow light of the second color to be transmitted; a third color filter disposed on the third sub-pixel of the second substrate to allow light of the third color to be transmitted; a light modulating layer located between the first substrate and the second substrate and capable of modulating a transmission mode indicating a light transmission property and a scattering mode indicating a light scattering property; and a light source unit illuminating the light modulating layer, emitting light of the first color in a first field for driving the first sub-pixel, emitting light of the second color in a second field for driving the second sub-pixel, and emitting light of the third color in a third field for driving the third sub-pixel, the method comprising: urging the light of the first color to be emitted from the light source unit, in the first field, and urging the light of the first color to be absorbed into the second and third color filters and the light of the first color to be emitted from the first substrate by setting at least one of the second and third sub-pixels in the scattering mode.

Various embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a diagram showing a configuration example of a display device DSP of a first embodiment.

In the example illustrated, a first direction X is a short-side direction of a display panel PNL. A second direction Y is a long-side direction of the display panel PNL, which is orthogonal to the first direction X. In addition, a third direction Z is a direction orthogonal to the first direction X and the second direction Y and is also a normal direction of the display panel PNL. The first direction X, the second direction Y and the third direction Z are not limited to directions orthogonal to each other but may intersect at an angle other than 90 degrees.

In the example illustrated, the display device DSP comprises a display panel PNL having a light transmitting property and a light source unit LU which illuminates the display panel PNL. The display panel PNL includes a display area DA on which an image is displayed, and a non-display area NDA located around the display area DA. The display panel PNL is, for example, a rectangular panel comprising a main surface PNLa which corresponds to a front surface, another main surface PNLb which corresponds to a rear surface, and side surfaces PNLc and PNLd which intersect the main surfaces PNLa and PNLb, and the main surfaces PNLa and PNLb are opposed to each other in the third direction Z. The side surfaces PNLc and PNLd are opposed to each other in the second direction Y.

The light source unit LU illuminates the interior of the display panel PNL. The light source unit LU is located outside a position opposed to the display area DA in the third direction Z, from the viewpoint of securing transparency in the display area DA of the display device DSP. In the example illustrated, the light source unit LU is opposed to the side surface PNLc in the second direction Y, emits light to the side surface PNLc and illuminates a light modulating layer OM. The number of the light source unit LU is not limited to one but two or more light source units may be disposed and, for example, may be opposed to the side surfaces PNLc and PNLd, respectively. The light source unit LU may not be opposed to the side surface PNLc in the second direction Y but, for example, may be disposed at a position inclined to the normal direction of the display panel PNL to emit light to the main surface PNLb.

The display panel PNL comprises the first substrate SUB1, the second substrate SUB2 and the light modulating layer OM. Each of the first substrate SUB1 and the second substrate SUB2 has a light transmitting property. The first substrate SUB1 and the second substrate SUB2 are opposed to each other in the third direction Z, the first substrate SUB1 is disposed on the main surface PNLa side and the second substrate SUB2 is disposed on the main surface PNLb side. The light modulating layer OM is located between the first substrate SUB1 and the second substrate SUB2. The light modulating layer OM can be reversibly changed in a state of having the light transmitting property and a state of having a light scattering property in some or all parts of the display area DA. In other words, the light modulating layer OM can modulate the strength of the light scattering property.

Main pixels PX (PX11, . . . , PXnm) are disposed in the display area DA. The main pixel PX corresponds to a minimum unit of display. For example, the main pixels PX11, . . . , PXn1 are arranged in this order in the first direction X1, based on the main pixel PX11. In addition, the main pixels PX11, . . . , PX1$m$ are arranged in this order in the second direction D2. The main pixel PX11 is located on a side close to a side surface PNLd and the main pixel PX1$m$ is located on a side close to a side surface PNLc. In the example illustrated, the main pixel PXxy comprises four sub-pixels PAxy, PBxy, PCxy and PDxy. In this case, x represents a positive integer of 1 to n, and y is a positive integer of 1 to m. In the following explanations, the sub-pixels PAxy, PBxy, PCxy and PDxy are often generically called sub-pixels PA, PB, PC and PD.

The main pixel PXxy has, for example, a rectangular shape, and the sub-pixel PAxy is adjacent to the sub-pixel PBxy in the first direction X and adjacent to the sub-pixel PDxy in the second direction Y. The sub-pixel PCxy is located diagonally to the sub-pixel PAxy in the main pixel PXxy, adjacent to the sub-pixel PDxy in the first direction X and adjacent to the sub-pixel PBxy in the second direction Y. However, the positional relationship among the sub-pixels PA, PB, PC and PD is not limited to the above but their positions may be exchanged.

A color filter FAxy is disposed in a region corresponding to the sub-pixel PAxy. Similarly, a color filter FBxy is disposed in a region corresponding to the sub-pixel PBxy, a color filter FCxy is disposed in a region corresponding to the sub-pixel PCxy, and a color filter FDxy is disposed in a region corresponding to the sub-pixel PDxy. The color filters FAxy, FBxy, FCxy and FDxy are disposed on, for example, the sub-pixels PAxy to PDxy of the second substrate SUB2, respectively. In other words, the main pixel PXxy comprises the color filters FAxy, FBxy, FCxy and FDxy. The positional relationship among the color filters FAxy, FBxy, FCxy and FDxy is similar to the positional relationship among the sub-pixels PAxy, PBxy, PCxy and PDxy. In the following explanations, the color filters FAxy, FBxy, FCxy and FDxy are often generically called color filters FA, FB, FC and FD.

For example, the sub-pixel PA is a red (R) pixel which exhibits a red color on the main surface PNLa and the color filter FA is a red (R) color filter which transmits red light. The sub-pixel PB is a green (G) pixel which exhibits a green color on the main surface PNLa and the color filter FB is a green (G) color filter which transmits green light. The sub-pixel PC is a blue (B) pixel which exhibits a blue color on the main surface PNLa and the color filter FC is a blue (B) color filter which transmits blue light. The color filters FA, FB, and FC are disposed on the second substrate SUB2 in the example illustrated but are not limited to this and may be disposed on, for example, the first substrate SUB1.

For example, the sub-pixel PD is a black (N) pixel which exhibits a black color on the main surface PNLa and the color filter FD is a black (N) color filter which absorbs white light. At this time, the sub-pixel PD corresponds to a dummy pixel and the color filter FD corresponds to a light absorbing layer. Since the color filter FD is disposed on the second substrate SUB2 side, the sub-pixel PD can exhibit white color to the main surface PNLb at the drive. Dummy pixels are included in the main pixels PX in the example illustrated but may be, for example, disposed independently of the main pixels PX and located between the main pixels PX.

However, the colors exhibited by the sub-pixels PA, PB and PC are not limited to the above but may be first to third colors different from each other. The color exhibited by the sub-pixel PD is not limited to black color but may be a fourth color having a lower brightness than the first to third colors. In this case, the color filters FA to FC transmit the first to third colors, respectively, and the color filter FD has a lower transmittance than the color filters FA to FC and transmits the fourth color.

Any one of the sub-pixels PA, PB, PC and PD may be a white (W) pixel exhibiting white color, in at least one of the main pixels PX. The color filter disposed on the W pixel is a white (W) color filter which transmits white light. However, the W pixel is not limited to a pixel exhibiting the white color but may be a pixel exhibiting a fifth color having a higher brightness than the first to third colors. In this case, the W color filter may transmit light of pale color for the purpose of adjusting cast of the color transmitted through the display panel PNL.

R, G, B and N color filters are formed of, for example, resins colored by red, green, blue and black color materials, respectively. The W color filter is formed of an uncolored transparent resin or a resin of pale color. In addition, since the W pixel needs only to exhibit white color, the W color filter may not be disposed.

FIG. 2 is a diagram showing a configuration example of a first substrate SUB1 shown in FIG. 1.

The illustrated display panel PNL is what is called an active-matrix type display panel. The first substrate SUB1 comprises electrodes in a region corresponding to the display area DA and a driving module DR in a region corresponding to a non-display area NDA.

An electrode EAxy is disposed in a region corresponding to the sub-pixel PAxy. Similarly, an electrode EBxy is disposed in a region corresponding to the sub-pixel PBxy, an electrode ECxy is disposed in a region corresponding to the sub-pixel PCxy, and an electrode EDxy is disposed in a region corresponding to the sub-pixel PDxy. In other words, the electrodes EAxy, EBxy, ECxy and EDxy are disposed in the main pixel PXxy. The electrode EAxy is opposed to the color filter FAxy shown in FIG. 1, the electrode EBxy is opposed to the color filter FBxy shown in FIG. 1, the electrode ECxy is opposed to the color filter FCxy shown in FIG. 1, and the electrode EDxy is opposed to the color filter FDxy shown in FIG. 1. In the following explanations, the electrodes EAxy, EBxy, ECxy and EDxy are often generically called electrodes EA, EB, EC and ED.

The driving module DR comprises a first driver Dr1 and a second driver Dr2. The first driver Dr1 corresponds to a data line drive circuit which supplies data signals for displaying an image to the electrodes EA to ED. From the first driver Dr1, i data lines S (S1, S2, . . . , Si) are drawn to the display area DA. The data lines S, for example, extend in the second direction Y and are arranged in the first direction X, in the display area DA. The second driver Dr2 corresponds to a scanning line drive circuit which supplies scanning signals for controlling input of data signals to the electrodes EA to ED. From the second driver Dr2, j scanning lines G (G1, G2, . . . , Gj) are drawn to the display area DA. The scanning lines G, for example, extend in the first direction X and are arranged in the second direction Y, in the display area DA. For example, the data line S1 supplies the data signals to pixel electrodes EA11, EB11, . . . , EAn1 and EBn1, respectively. The scanning line G1 transmits the scanning signals to the pixel electrodes EA11, ED11, . . . , EA1m and ED1m, respectively. However, the direction of extension of the data lines S and the scanning lines G is not particularly limited but each of the lines may be partially bent. In addition, the data lines S may extend in the first direction X and the scanning lines G may extend in the second direction Y.

FIG. 3 is a cross-sectional view showing the configuration example of the display panel PNL shown in FIG. 1.

The cross-section shown in the figure is an example of a cross-section in the second direction Y, which includes the main pixels PX11 and PX13 adjacent in the second direction Y and which includes the sub-pixels PA and PD. The color filters FA11 and FD11, and the electrodes EA11 and ED11 are disposed in the main pixel PX11 while the color filters FA13 and FD13, and the electrodes EA13 and ED13 are disposed in the main pixel PX13.

The first substrate SUB1 comprises an insulating substrate 10, the electrodes EA11, ED11, EA13 and ED13, and an alignment film AL1. The insulating substrate 10 is formed of a glass substrate or resin substrate having a light transmitting property. The electrodes EA11, ED11, EA13 and ED13 are disposed on a side closer to the second substrate SUB2 of the insulating substrate 10 and arranged in this order in the second direction Y. The electrodes EA11, ED11, EA13 and ED13 are spaced apart from each other in the second direction Y. An interval between the electrodes ED11 and EA13 is larger than an interval between the electrodes EA11 and ED11. The electrodes EA and ED are formed of a transparent conductive material, for example, indium tin oxide (ITO) and indium zinc oxide (IZO). An alignment film AL2 is disposed on a side of the light modulating layer OM of the second substrate SUB2 and overlaps with the electrodes EA and ED.

The second substrate SUB2 comprises an insulating substrate 20, the color filters FA11, FD11, FA13 and FD13, an overcoat layer OC, a common electrode CE, and the alignment film AL2. In addition, in the example illustrated, the second substrate SUB2 comprises light reflecting layers RF. The insulating substrate 20 is formed of a glass substrate or resin substrate having a light transmitting property.

The color filters FA11, FD11, FA13 and FD13 are disposed on a side of the light modulating layer OM of the insulating substrate 20, and opposed to the electrodes EA11, ED11, EA13 and ED13, respectively, in the third direction Z. The color filters FA11 and FD11 are adjacent to each other at a pitch PT1 in the second direction Y, and are in contact with each other in the example illustrated. The color filters FD11 and FA13 are adjacent to each other at a pitch PT2 greater than the pitch PT1 in the second direction Y, and are spaced apart from each other. The overcoat layer OC is located, for example, between the color filters FD11 and FA13. The color filters FA13 and FD13 are adjacent to each other at the pitch PT1 in the second direction Y. The pitch is assumed to be an interval between centers of adjacent color filters. However, the pitch may indicate the interval between end portions of the adjacent color filters on a side on which arrows of the second direction Y are located (or its opposite side). In other words, the pitch PT1 corresponds to the interval in the second direction Y between the center of the electrode EA11 and the center of the electrode ED11. In addition, the pitch PT2 corresponds to the interval in the second direction Y between the center of the electrode ED11 and the center of the electrode EA13.

In the example illustrated, the color filters FD correspond to the light-absorbing layers, and the light reflecting layers RF are disposed between the light-absorbing layer and the light modulating layer OM. The light reflecting layers RF need only to be disposed on the main surface PNLb side of the color filters FD. The light reflecting layers RF is formed of a metal material having a high optical reflectivity and reflects light traveling to the main surface PNLa side toward the main surface PNLb side. Therefore, the luminance of the sub-pixel PD corresponding to the dummy pixel on the main pixel PNLa side can be suppressed and the luminance on the main pixel PNLb side can be improved. If the light reflecting layers RF are disposed on the second substrate SUB2, the light traveling from the light modulating layer OM to the main surface PNLa can be blocked by the light reflecting layers RF. For this reason, the color filters FD are not limited to N color filters but may be filters of a color brighter than black. The color filters FD can suppress glare of an image displayed on the main surface PNLa if the color filters FD have a color which enables the light reflected on the color filter FD side of the light reflecting layers RF to be reduced.

The overcoat layer OC is disposed on a side of the insulating substrate 20, and the color filters FA and FD which is close to the first substrate SUB1, and covers, for example, the color filters FA and the light reflecting layers RF. If the color filter FD11 is the W color filter, the color filter FD11 may not be disposed and the overcoat layer may be disposed at the position of the color filter FD11.

The common electrode CE is disposed on a side of the light modulating layer OM of the overcoat layer OC of the second substrate SUB2, and covers, for example, the overcoat layer OC. The common electrode CE is opposed to the electrodes EA11, EA13, ED11 and ED13 in the third direction Z. In addition, the common electrode CE also extends to a region between the main pixels PX11 and PX13, and is also disposed in a region between the electrodes ED11 and EA13. The common electrode CE is formed of a transparent conductive material such as ITO or IZO. The alignment film AL2 is disposed on a side of the light modulating layer OM of the common electrode CE opposed to the first substrate SUB1 and covers, for example, the common electrode CE.

The light modulating layer OM is located between the first substrate SUB1 and the second substrate SUB2, and is adjacent to the alignment films AL1 and AL2. The light modulating layer OM can modulate light scattering properties of regions corresponding to the respective sub-pixels PA, PB, PC and PD in accordance with the magnitude and orientation of electric fields generated by the respective electrodes EA, EB, EC and ED. For example, the light modulating layer OM urges the light incident on the region corresponding to the color filter FA to be scattered when a voltage is not applied to the electrode EA, and urges the light incident on the region corresponding to the color filter FA to be transmitted when a voltage is applied to the electrode EA. The light modulating layer OM is a composite layer containing, for example, a bulk 31 and fine particles 32 dispersed in the bulk 31. The fine particles 32 correspond to a first region and the bulk 31 corresponds to a second region.

Each of the bulk 31 and the fine particles 32 has optical anisotropy. For example, the magnitude of the refractive anisotropy of the liquid crystal material (liquid crystal molecules LM to be explained later) contained in the fine particles 32 is equal to the magnitude of the refractive anisotropy of the monomer constituting the polymeric material. In addition, the bulk 31 and the fine particles 32 are different in the rate of response to the electric fields. For example, the bulk 31 has a strip-shaped structure or porous structure which does not respond to the electric fields. Alternatively, the bulk 31 has a strip-shaped structure or rod-shaped structure which has a response rate slower than the response rate of the fine particles 32. The bulk 31 is constituted by, for example, a solid polymeric material which can be obtained by polymerizing low molecular weight monomer having alignment and polymerization properties with at least one of heat and light. In contrast, the fine particles 32 are, for example, constituted by mainly containing the liquid crystal material and are a liquid having a higher degree of freedom of molecules than the bulk 31. In other words, the fine particles 32 have a sufficiently higher response rate than the response rate of the bulk 31.

The monomer of the bulk 31 and the liquid crystal material of the fine particles 32 are aligned by receiving an alignment restriction force from the alignment films AL1 and AL2. The alignment films AL1 and AL2 are vertical alignment films or horizontal alignment films, but their material is not particularly limited if it is blended with the monomer or liquid crystal material and, for example, the alignment films are formed of polyimide or polyamidimide. The molecular alignment of the bulk 31 (polymeric material) is stabilized by polymerizing the alignment films in a state in which the monomer is aligned. If the monomer is able to be aligned without using the alignment film AL1 or AL2, the alignment films AL1 and AL2 may not be disposed. For example, the liquid crystal material and the monomer used for the light modulating layer OM can also be aligned by applying the electric fields and the magnetic fields between the electrode EA and the common electrode CE or between the electrode ED and the common electrode CE. In other words, the molecular alignment of the bulk 31 (polymeric material) can be stabilized by polymerizing the monomer while applying the electric fields and magnetic fields between the electrode EA (EB, EC and ED) and the common electrode CE. When the electric fields are used for alignment of the liquid crystal material and the monomer, electrodes for alignment and electrodes for drive can be formed separately or dual-frequency liquid crystal in which codes of dielectric anisotropy are inverted according to frequency or the like can be used as the liquid crystal material. In addition, when the magnetic fields are used for alignment of the liquid crystal material and the monomer, materials having great magnetic anisotropy, for example, materials including a number of benzene rings are desirably used as the liquid crystal material and the monomer.

A material which is optically anisotropic and which is combined with the liquid crystal may be used as the monomer having alignment and polymerization properties and forming the bulk 31, but may desirably be a low molecular weight monomer which is cured with ultraviolet rays in the present embodiment. When the liquid crystal material is used as the fine particles 32, if the liquid crystal material contains rod-shaped molecules, the monomeric material to be used is desirably rod-shaped. Based on the above, the material having the properties of polymerization and liquid crystal may desirably be used as the monomeric material and may desirably include, for example, at least one functional group selected from a group comprising of an acrylate group, a methacrylate group, an acryloyloxy group, a methacryloyloxy group, a vinyl ether group and an epoxy group as a polymeric functional group. These functional groups can be polymerized by application of ultraviolet rays, infrared rays or an electron beam or by heating. To suppress deterioration in alignment degree at application of ultraviolet rays, a liquid crystal material including a polyfunctional group can also be added. If the bulk 31 has the above-explained strip-shaped structure, a bifunctional liquid crystal monomer may desirably be used as the raw material of the bulk 31. In addition, a monofunctional monomer can be added to the raw material of the bulk 31 for the purpose of adjusting the temperature indicating the liquid crystal property or a trifunctional or higher monomer can be added to the raw material of the bulk 31 for the purpose of increasing the cross-link density.

Incidentally, the light scattered on the light modulating layer OM is scattered toward both the main surface PNLa side and the main surface PNLb side. Therefore, in the structure in which the R, G, B and N color filters are disposed on the second substrate SUB2, the R pixel at the drive (in a scattering mode to be explained later) exhibits red color on the main surface PNLa and exhibits pale red on the main surface PNLb. This is because part of the light scattered toward the main surface PNLa on the light modulating layer OM of the R pixel is transmitted through the R color filter, reflected on interfaces of the respective members of the second substrate SUB2, and travels to the main surface PNLb. If the light reflected on the second substrate SUB2 is weak, the R pixel at the drive exhibits white color on the main surface PNLb. Similarly, the G pixel at the drive exhibits pale green or white color on the main surface PNLb and the B pixel at the drive exhibits pale blue or white color on the main surface PNLb. The dummy pixel at the drive exhibits white color on the main surface PNLb.

Figure 4:
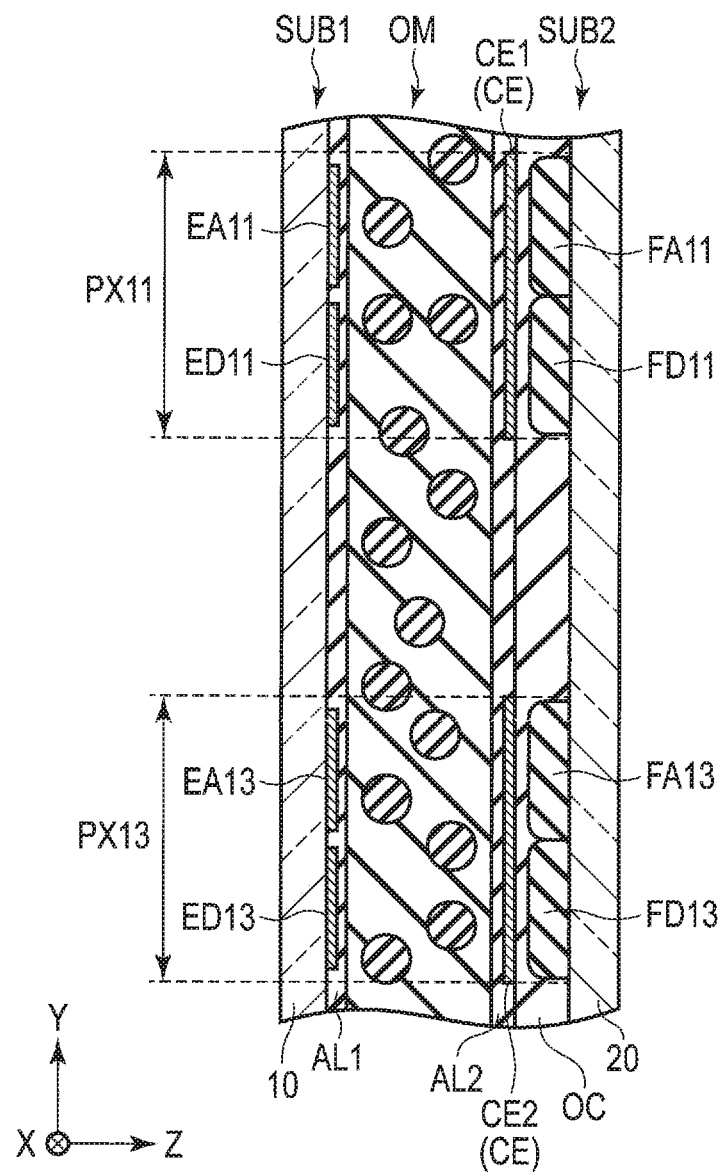
FIG. 4 is a cross-sectional view showing another configuration example of the display panel PNL shown in FIG. 1.

FIG. 4 is a cross-sectional view showing another configuration example of the display panel PNL shown in FIG. 1.

The configuration example illustrated is different from the configuration example shown in FIG. 3 with respect to a feature that the common electrode CE is discontinuous. The common electrode CE comprises common electrodes CE1 and CE2 separated from each other in the second direction Y.

The common electrode CE1 is opposed to the electrodes EA11 and ED11. The common electrode CE2 is opposed to the electrodes EA13 and ED13. No common electrode CE is disposed at a position opposed to a region between the electrodes ED11 and EA13, i.e., in a region between the main pixels PX11 and PX13. For this reason, the light transmittance between the main pixels PX can be increased and the light transmittance of the display panel PNL can be increased.

Figure 5:
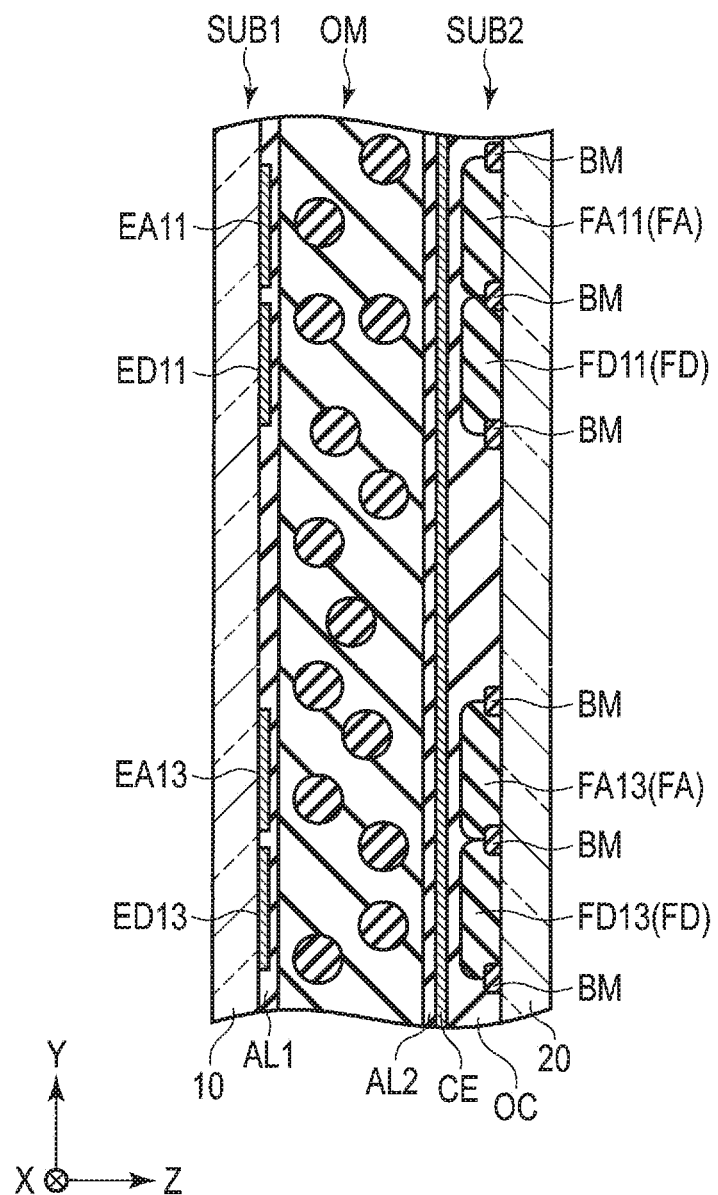
FIG. 5 is a cross-sectional view showing yet another configuration example of the display panel PNL shown in FIG. 1.

FIG. 5 is a cross-sectional view showing yet another configuration example of the display panel PNL shown in FIG. 1.

The configuration example illustrated is different from the configuration example shown in FIG. 3 with respect to a feature of comprising light-shielding layers BM. The light-shielding layers BM have a light-shielding property and are formed of, for example, a black resin or a black metal. The light-shielding layers BM are disposed on a side of the light modulation layer OM of the insulating substrate 20 which is opposed to the first substrate SUB1. The light-shielding layers BM are opposed to the color filters FA11, FD11, FA13 and FD13 in the third direction Z, at the end portions of the color filters in the second direction. The light-shielding layers BM may be opposed to, for example, the electrodes EA11, ED11, EA13 and ED13 in the third direction Z, at the end portions of the electrodes EA11, ED11, EA13 and ED13 in the second direction. The light-shielding layers BM can be opposed to data lines S and scanning lines G (not shown) in the third direction Z and block the light reflected on the conductive lines. In addition, color mixture which occurs by allowing the light modulated in a region corresponding to an electrode to be transmitted through a color filter opposed to the other electrode in the third direction Z can be suppressed.

FIG. 6 is an illustration showing a configuration example of a light source unit LU shown in FIG. 1.

The light source unit LU is constituted by, for example, arranging light sources 23 in a row in the second direction Y. Each of the light sources 23 emits light toward a side surface PNLc and is composed of, for example, light emitting elements comprising light emitting spots on surfaces opposed to the side surface PNLc. Examples of the light emitting elements include, for example, a light emitting diode (LED), a laser diode (LD), and the like.

For example, every two or more light sources 23 emitting light of mutually different colors are disposed on a common substrate 24. In this case, a light source block 25 is constituted by the single substrate 24 and a plurality of light sources 23 disposed on the substrate 24. The light source block 25 is configured to apply, for example, white light. In the example illustrated, the light source block 25 comprises light sources 23A, 23B, and 23C. The light sources 23A, 23B, and 23C are a red (R) light source which emits red light, a green (G) light source which emits green light and a blue (B) light source which emits blue light, respectively, and the light source block 25 can function as a white light source by turning on all the light sources.

The substrate 24 is, for example, a circuit board on which conductive lines for electrically connecting the light sources 23 with a drive circuit CM (a part of a controller 100 to be explained later) controlling the drive of the light sources 23 are formed, and each of the light sources 23 is mounted on the circuit board. The light sources 23 arranged on the common substrate 24 (i.e., the light sources 23A, 23B, and 23C in the light source block 25) are configured to be driven independently of each other by the drive circuit CM but may be configured to be driven together (nonindependently). In addition, the light sources 23 arranged on the different substrates 24 (i.e., the light sources 23 in the light source blocks 25) are, for example, configured to be driven independently of each other by the drive circuit CM and are, for example, connected in different current paths. The light sources 23 provided on the different substrates 24 (i.e., the light sources 23 in the light source blocks 25) may be, for example, configured to be driven together (nonindependently) by the drive circuit CM. A plurality of light sources 23A, a plurality of light sources 23B, and a plurality of light sources 23C arranged on each of the substrates 24 may be driven together.

In the example illustrated, the display device DSP displays an image on the main surface PNLa by using at least one of external light Lout and illumination light Lin. The external light Lout is the light incident on the display panel PNL from the main surface PNLb and corresponds to, for example, environmental light such as solar light and external illumination. The incidence surface of the external light Lout is the main surface PNLb. The illumination light Lin is the light incident on the display panel PNL from the light source unit LU. The incidence surface of the illumination light Lin is, for example, the side surface PNLc. The display device DSP may be configured to use any one of the external light Lout and the illumination light Lin or to use both the light for the image display. In addition, the display device DSP may display an image by appropriately selecting the external light Lout or the illumination light Lin in accordance with the external environment. However, the display device DSP may be configured to display an image by using the external light Lout alone and at this time the light source unit is not provided.

The display panel PNL displays an image by urging the external light Lout or the illumination light Lin to be transmitted or scatted on a part or all the parts of the display area DA. A state of the light modulating layer OM showing the light scattering property is called a scattering mode, and a state in which the light modulating layer OM does not show the light scattering property and has higher light transmitting property than the scattering mode is called a transmission mode. The display panel PNL displays an image by setting the sub-pixels contributing to the display to be in the scattering mode and setting the sub-pixels not contributing to the display to be in the transmission mode. A principle of variation in light scattering property of the light modulating layer OM will be schematically explained with reference to FIG. 7 and FIG. 8. FIG. 7 shows the light modulating layer OM in a state in which the electric field is not formed, and FIG. 8 shows the light modulating layer OM in a state in which the electric field is formed.

FIG. 7 is an illustration showing the display panel PNL in a case where a light modulating layer OM has a scattering property.

A power source PS is electrically connected with the common electrode CE, and a switch SW of a conductive line connecting the electrode EA and the power source PS is opened. In other words, a voltage is not applied to the electrode EA or a potential difference is not generated between the electrode EA and the common electrode CE.

The liquid crystal materials (liquid crystal molecules LM) contained in the fine particles 32 (liquid crystal drops LQ) are, for example, rod-shaped molecules. The liquid crystal molecules LM are aligned at random in the liquid crystal drops LQ. At this time, the refractive index of the bulk 31 and the refractive index of the fine particles 32, for the external light Lout and the illumination light Lin, are different from each other. The external light Lout and the illumination light Lin are therefore refracted on the interface between the bulk 31 and the fine particles 32. Thus, the external light Lout and the illumination light Lin are scattered on the light modulating layer OM, and the scattered light of the external light Lout and the illumination light Lin is emitted from the main surfaces PNLa and PNLb.

FIG. 8 is an illustration showing the display panel PNL in a case where the light modulating layer OM has transparency.

The switch SW is closed, a voltage is applied to the electrode EA from the power source PS, and a potential difference is generated between the electrode EA and the common electrode CE.

In the example illustrated, the liquid crystal molecules LM are so called positive liquid crystal having a positive dielectric anisotropy. For this reason, the liquid crystal molecules LM are aligned in the third direction Z which is the direction of the electric field formed in the light modulating layer OM, in the liquid crystal drops LQ. At this time, for example, the refractive anisotropy of the polymer forming the bulk 31 matches the refractive anisotropy of the liquid crystal molecules LM, and the refractive index of the bulk 31 and the refractive index of the fine particles 32 for the external light Lout and the illumination light Lin are equivalent to each other. The external light Lout is therefore transmitted through the light modulating layer OM without being substantially scattered and is emitted from the main surface PNLa. In addition, the illumination light Lin is also transmitted through the light modulating layer OM without being substantially scattered.

As explained above, the light modulating layer OM can switch the light transmitting property and the light scattering property, based on turning on and off the voltage applied to the electrode EA, i.e., presence and absence of the electric field formed in the light modulating layer OM.

The light modulating layer OM shows the scattering property when no electric fields are formed, in the configuration explained with reference to FIG. 7 and FIG. 8 but is a mere example and may be configured to show the scattering property when electric fields are formed. A structure in which the light modulating layer OM shows the scattering property when electric fields are formed may be, for example, a structure in which the bulk 31 has a strip-shaped structure extending in the second direction Y along the polymeric molecular alignment and the liquid crystal molecules LM are the negative liquid crystal having a negative dielectric anisotropy aligned along the strip-shaped structure of the bulk 31. In this structure, the liquid crystal molecules LM are aligned in the second direction Y and the refractive anisotropies of the bulk 31 and the fine particles 32 match when no electric fields are formed. The liquid crystal molecules LM are aligned in the third direction Z and the refractive anisotropies of the bulk 31 and the fine particles 32 become different from each other when the electric fields are formed.

As described above, the display device DSP displays an image by urging the external light Lout or the illumination light Lin to be transmitted or scattered, in the configuration example. Since the main pixel PX comprises the R pixel, the B pixel, G pixel and the dummy pixel, the image can be displayed on the main surface PNLa as a color image. At this time, the inverted image is displayed on the main surface PNLb as a monochromatic or pale color image, but the display device DSP can degrade the visibility of the inverted image displayed on the main surface PNLb without degrading the visibility of the image displayed on the main surface PNLa, by driving the dummy pixels irregularly or regularly (for example, in grating state).

If the light reflecting layers RF are disposed on the dummy pixels, the visibility of the inverted image displayed on the main surface PNLb can be further degraded since the luminance of the dummy pixels on the main surface PNLb side is increased. If the light absorbing layer is the N color filter, the degradation in display quality of the image displayed on the main surface PNLa can be suppressed since light leakage to the main surface PNLa side can be suppressed when the dummy pixels are driven.

In addition, in the above configuration example, the display device DSP can obtain the same advantages not only when the image is displayed with the external light Lout made incident on the display panel PNL from the main surface PNLb, but also when the image is displayed with the illumination light Lin made incident on the display panel PNL from the main surface PNLc, since the R, G, and B color filters and the light absorbing layer are disposed on the second substrate SUB2.

Therefore, the present embodiment can provide the display device in which information can hardly be obtained from the rear surface side.

The display device DSP can vary the transparency of the display panel PNL by varying the density of the color filter. In other words, the transmittance of the display panel PNL can be improved within a range in which necessary resolution can be obtained, by setting the pitch PT2 to be larger than the pitch PT1. In addition, the positions of the dummy pixels are not limited inside the main pixels PX but the dummy pixels may be disposed between the main pixels PX. An arrangement example of the color filters will be explained. In the following arrangement example, a first color filter is a red color filter CFR, a second color filter is a green color filter CFG, a third color filter is a blue color filter CFB, a fourth color filter (light absorbing layer) is a black color filter CFN, and a fifth color filter is a white color filter CFW, and are not limited to those but the first to fifth colors may be the other colors as explained with reference to FIG. 1. The positions and areas of the first to fifth color filters correspond to the positions and areas of the first to fifth sub-pixels, respectively. For this reason, the R, G, B, N, and W color filters can be restated to R, G, B, N and W pixels, respectively, in the following descriptions.

Figure 9:
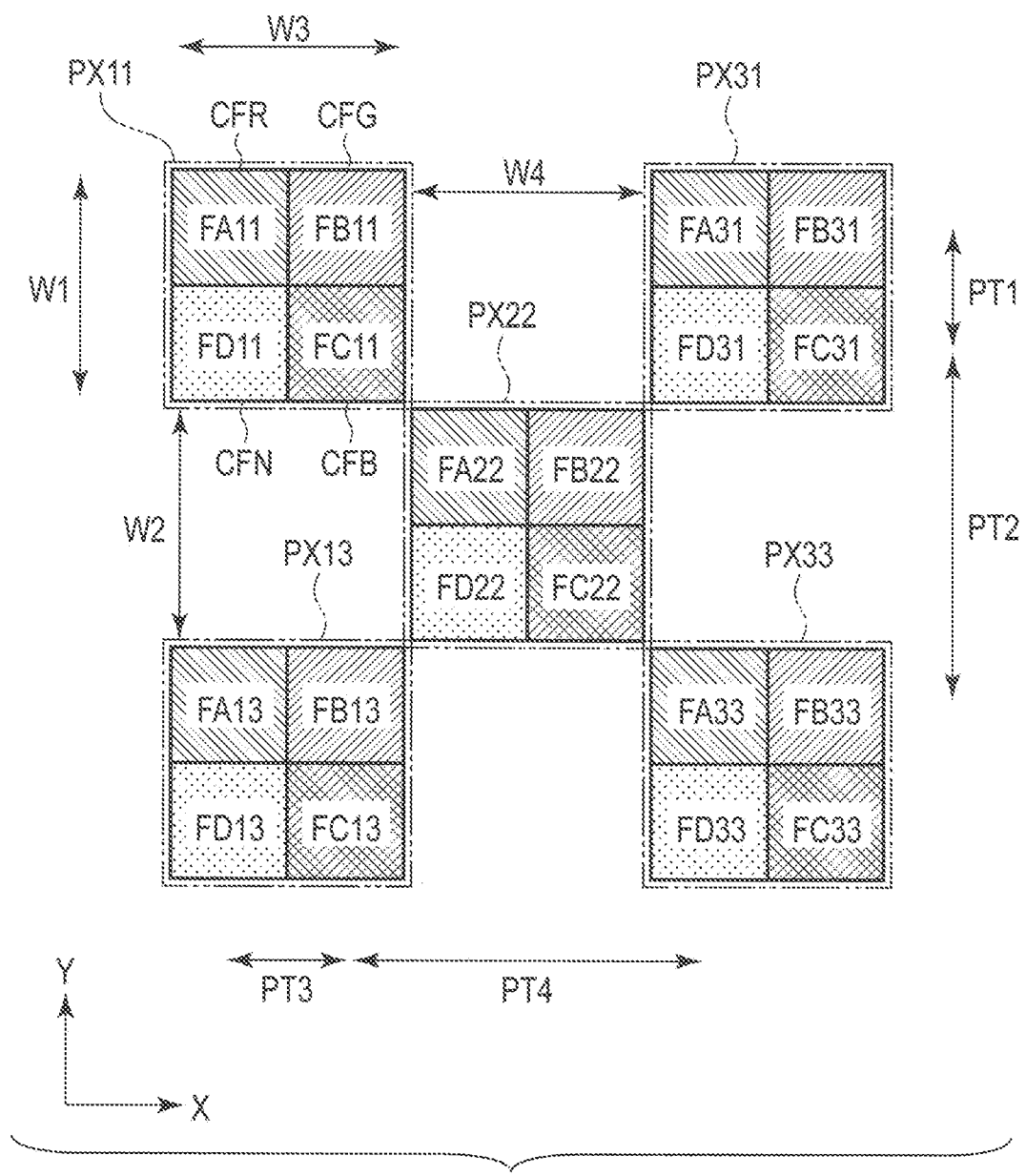
FIG. 9 is a diagram showing an arrangement example of color filters.

FIG. 9 is a diagram showing an arrangement example of the color filters.

Each of the main pixels PX (PX11, PX31, PX22, PX13 and PX33) comprises the red color filter CFR, the green color filter CFG, the blue color filter CFB, and the black color filter (light absorbing layer) CFN as shown in FIG. 1. The red color filter CFR is a region represented by a hatch pattern of downward sloping lines, the green color filter CFG is a region represented by a hatch pattern of upward sloping lines, the blue color filter CFB is a region represented by a grating pattern, and the black color filter CFN is a region represented by a dot pattern.

In the example illustrated, each main pixel PX is a rectangular pixel having a width W1 in the second direction Y and a width W3 in the first direction X. The main pixels PX11 and PX31 are arranged in the same line along the first direction X and spaced apart at an interval W4. The main pixels PX11 and PX13 are arranged in the same line along the second direction Y and spaced apart at an interval W2. In other words, ends of the red color filter CFR in the main pixel PX31 and the green color filter CFG in the main pixel PX11 on opposed sides are opposed and spaced apart at the interval W4. In addition, ends of the green color filter CFG in the main pixel PX13 and the blue color filter CFB in the main pixel PX11 on opposed sides are opposed and spaced apart at the interval W2. The main pixels PX13 and PX33 are also arranged in the same line along the first direction X and spaced apart at the interval W4. The main pixels PX31 and PX33 are also arranged in the same line along the second direction Y and spaced apart at the interval W2. The region between the main pixels PX is a transparent region in which no color filters are arranged.

For example, the interval W4 is equal to the width W3, and the interval W2 is equal to the width W1. In other words, the main pixels PX are arranged in the first direction X and the second direction Y and spaced apart at an interval of one pixel. The interval W2 may be greater than the width W1, and the interval W4 may be greater than the width W3. From the viewpoint of a pitch between the color filters, the pitch PT2 between the color filters adjacent in the second direction Y and arranged in the different pixels is three or more times as great as the pitch PT1 between the color filters adjacent in the second direction Y and arranged in the same pixel. In addition, the pitch PT4 between the color filters adjacent in the first direction X and arranged in the different pixels is three or more times as great as the pitch PT3 between the color filters adjacent in the first direction X and arranged in the same pixel.

The main pixel PX22 is located between the main pixels PX11 and PX33 and between the main pixels PX31 and the main pixel PX13. A corner of the red color filter CFR in the main pixel PX22 is adjacent to a corner of the blue color filter CFB in the main pixel PX11. A corner of the green color filter CFG in the main pixel PX22 is adjacent to a corner of the black color filter CFN in the main pixel PX31. A corner of the blue color filter CFG in the main pixel PX22 is adjacent to a corner of the red color filter CFR in the main pixel PX33. A corner of the black color filter CFN in the main pixel PX22 is adjacent to a corner of the green color filter CFG in the main pixel PX13. In other words, the main pixel PX22 is not located between the main pixels PX11 and PX31, between the main pixels PX11 and PX13, between the main pixels PX33 and PX31 or between the main pixels PX33 and PX13.

In the configuration in which the main pixels PX are arranged in a zigzag shape, scattering and attenuating in the region corresponding to the main pixel PX22 the light emitted from the light source unit LU to illuminate the region corresponding to the main pixel PX11 can be suppressed. In other words, occurrence of the gradient of brightness (non-uniformity in display) according to a distance from the light source unit LU to the displayed portion can be suppressed in the display area DA and the display quality of the display device DSP can be improved.

Figure 10:
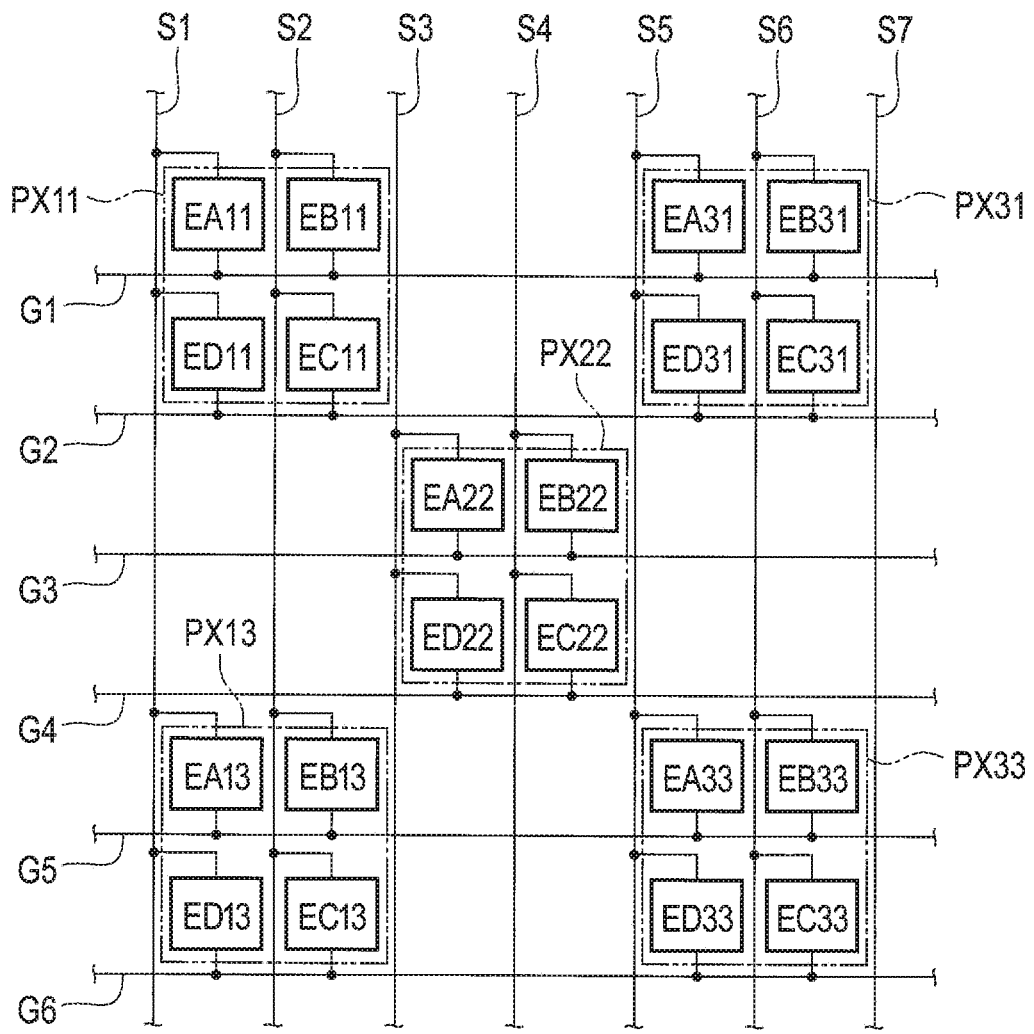
FIG. 10 is a diagram showing a configuration example of data lines S and scanning lines G corresponding to the arrangement example of the color filters shown in FIG. 9.

FIG. 10 is a diagram showing a configuration example of data lines S and scanning lines G corresponding to the arrangement example of the color filters shown in FIG. 9.

The main pixel PX11 comprises electrodes EA11, EB11, EC11 and ED11, the main pixel PX31 comprises electrodes EA31, EB31, EC31 and ED31, the main pixel PX22 comprises electrodes EA22, EB22, EC22 and ED22, the main pixel PX13 comprises electrodes EA13, EB13, EC13 and ED13, and the main pixel PX33 comprises electrodes EA33, EB33, EC33 and ED33, as electrodes opposed to the red color filter CFR, the green color filter CFG, the blue color filter CFB and the black color filter CFN, respectively.

The electrodes EA11, ED11, EA13 and ED13 are supplied with data signals by a data line S1. The electrodes EB11, EC11, EB13 and EC13 are supplied with data signals by a data line S2. The electrodes EA22 and ED22 are supplied with data signals by a data line S3. The electrodes EB22 and EC22 are supplied with data signals by a data line S4. The electrodes EA31, ED31, EA33 and ED33 are supplied with data signals by a data line S5. The electrodes EB31, EC31, EB33 and EC33 are supplied with data signals by a data line S6.

Driving the electrodes EA11, EB11, EA31 and EB31 is controlled by a scanning line G1. Driving the electrodes ED11, EC11, ED31 and EC31 is controlled by a scanning line G2. Driving the electrodes EA22 and EB22 is controlled by a scanning line G3. Driving the electrodes ED22 and EC22 is controlled by a scanning line G4. Driving the electrodes EA13, EB13, EA33 and EB33 is controlled by a scanning line G5. Driving the electrodes ED13, EC13, ED33 and EC33 is controlled by a scanning line G6.

Figure 11:
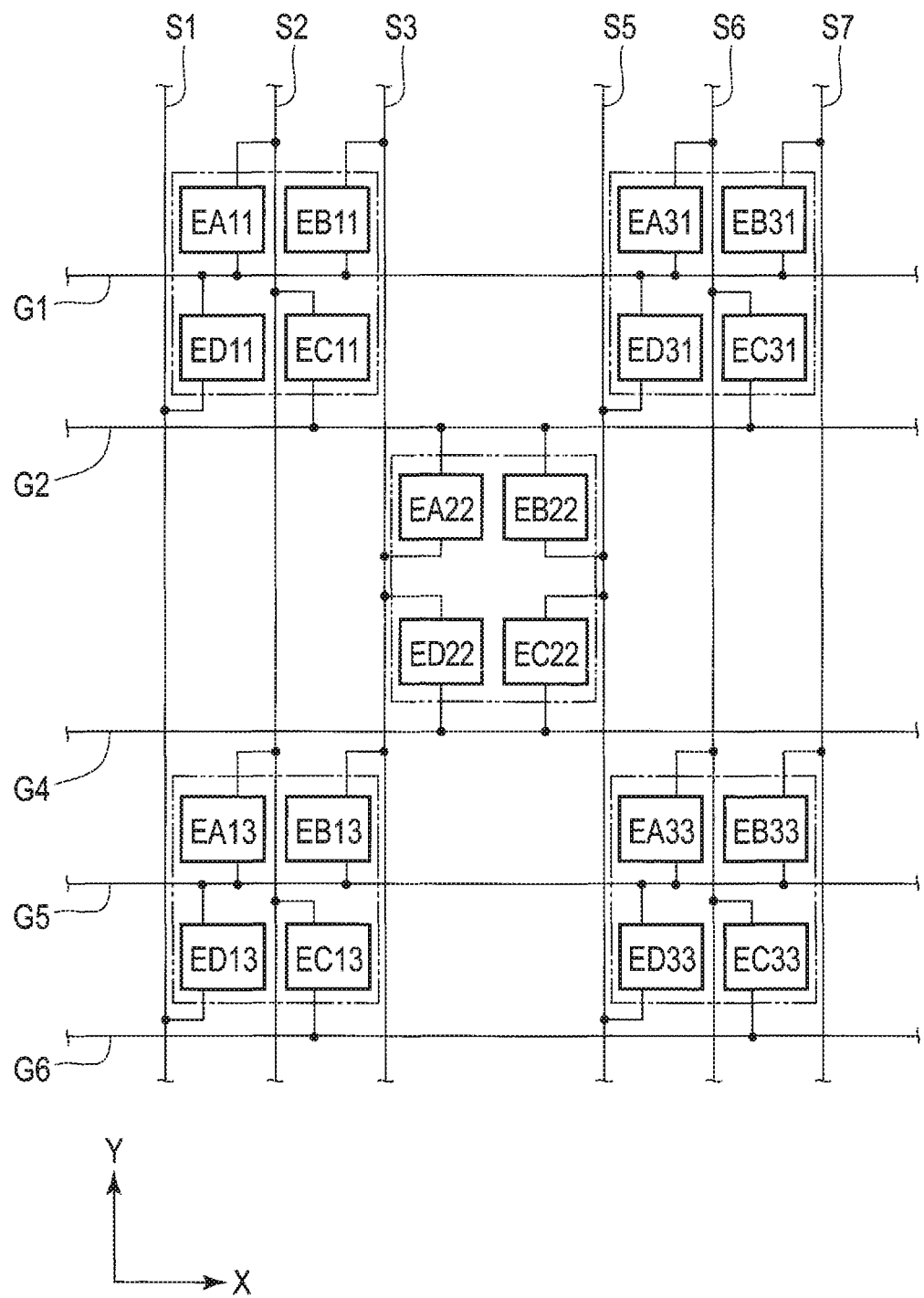
FIG. 11 is a diagram showing another configuration example of the data lines S and the scanning lines G corresponding to the arrangement example of the color filters shown in FIG. 9.

FIG. 11 is a diagram showing another configuration example of the data lines S and the scanning lines G corresponding to the arrangement example of the color filters shown in FIG. 9.

The present configuration example is different from the configuration example shown in FIG. 10 with respect to a feature that the data line S4 or the scanning line G3 is not disposed. In the example illustrated, driving the electrodes ED11, EA11, EB11, ED31, EA31 and EB31 is controlled by the scanning line G1. Driving the electrodes EC11, EA22, EB22 and EC31 is controlled by the scanning line G2. Driving the electrodes ED22 and EC22 is controlled by the scanning line G4. Driving the electrodes ED13, EA13, EB13, ED33, EA33 and EB33 is controlled by the scanning line G5. Driving the electrodes EC13 and EC33 is controlled by the scanning line G6. In addition, the electrodes ED11 and ED13 are supplied with data signals by the data line S1. The electrodes EA11, EC11, EA13 and EC13 are supplied with data signals by the data line S2. The electrodes EB11, EA22, ED22 and EB13 are supplied with data signals by the data line S3. The electrodes ED31, EB22, EC22 and ED33 are supplied with data signals by the data line S5. The electrodes EA31, EC31, EA33 and EC33 are supplied with data signals by the data line S6. The electrodes EB31 and EB33 are supplied with data signals by a data line S7.

According to the present configuration example, the number of the data lines S and the number of the scanning lines G can be reduced and the transmittance of the display panel PNL can be improved.

Figure 12:
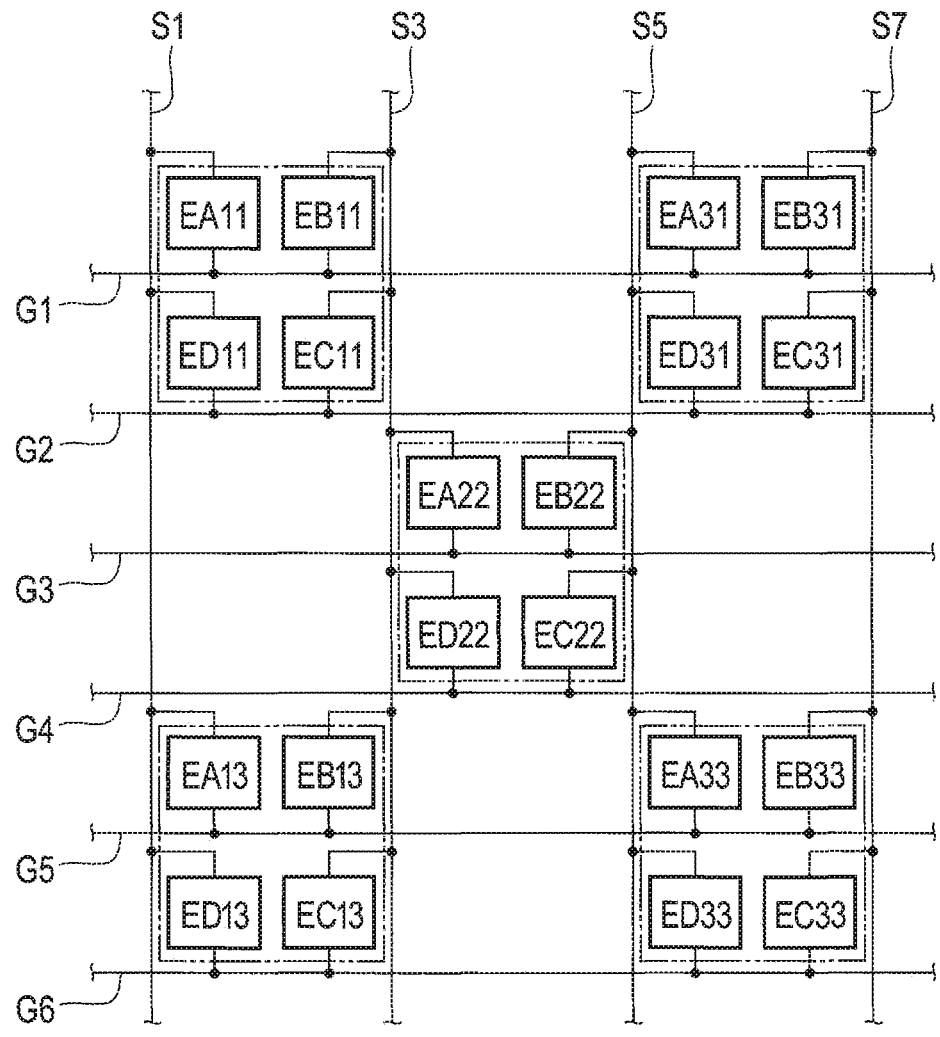
FIG. 12 is a diagram showing yet another configuration example of the data lines S and the scanning lines G corresponding to the arrangement example of the color filters shown in FIG. 9.

FIG. 12 is a diagram showing yet another configuration example of the data lines S and the scanning lines G corresponding to the arrangement example of the color filters shown in FIG. 9.

The present configuration example is different from the configuration example shown in FIG. 10 with respect to a feature that the data lines S2, S4 and S6 are not disposed. In the example illustrated, the electrodes EB11, EC11, EA22, ED22, EB13 and EC13 are supplied with data signals by the data line S3. The electrodes EA31, ED31, EB22, EC22, EA33 and ED33 are supplied with data signals by a data line S5. The electrodes EB31, EC31, EB33 and EC33 are supplied with data signals by the data line S7. According to the present configuration example, the number of the data lines S can be reduced.

Figure 13:
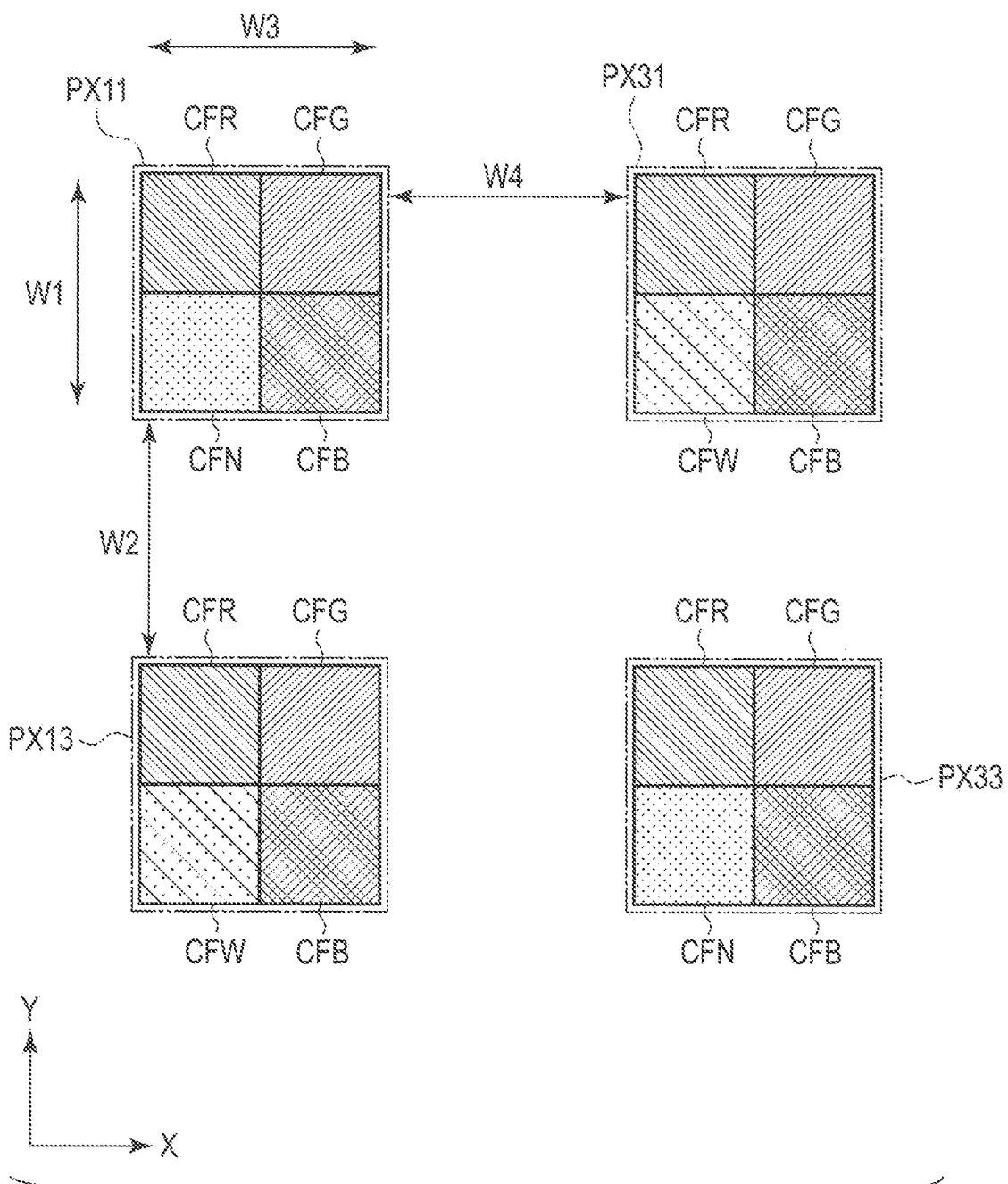
FIG. 13 is a diagram showing another arrangement example of the color filters.

FIG. 13 is a diagram showing another arrangement example of the color filters.

The present configuration example is different from the configuration example shown in FIG. 9 with respect to features that the main pixel PX22 is not disposed and the main pixels are arrayed in a matrix and that some of the black color filters CFN are replaced with the white color filters CFW. The white color filter CFW is a region represented by a combination of a dot pattern and a hatch pattern of downward sloping lines.

The interval W2 is not particularly limited and may be smaller than the width W1. In addition, the interval W4 is not limited either and may be smaller than the width W3. Each of the main pixels PX11 and PX33 comprises the red color filter CFR, the green color filter CFG, the blue color filter CFB, and the black color filter CFN, similarly to the arrangement example shown in FIG. 9. Each of the main pixels PX31 and PX13 comprises the red color filter CFR, the green color filter CFG, and the blue color filter CFB, and also comprises the white color filter CFW instead of the black color filter CFN. In other words, the black color filter CFN of the main pixel PX11, the blue color filter CFB of the main pixel PX11, the white color filter CFW of the main pixel PX31, and the blue color filter CFB of the main pixel PX31 are arranged in this order in the first direction X. In addition, the red color filter CFR of the main pixel PX11, the black color filter CFN of the main pixel PX11, the red color filter CFR of the main pixel PX13, and the white color filter CFW of the main pixel PX13 are arranged in this order in the second direction Y.

The main pixels PX comprising the black color filters CFN and the main pixels PX comprising the white color filters CFW are disposed in number proportion of 1:1 in the example illustrated but are not limited to this and the number of the main pixels PX comprising the black color filters CFN may be larger than the number of the main pixels PX comprising the white color filters CFW. Oppositely, the number of the main pixels PX comprising the white color filters CFW may be larger than the number of the main pixels PX comprising the black color filters CFN. The main pixels PX comprising the black color filters CFN and the main pixels PX comprising the white color filters CFW are alternately arranged in the first direction X and the second direction Y in the example illustrated but are not limited to this and, for example, the main pixels PX may be alternately arranged in the first direction X and the main pixels PX having the same configuration may be arranged in the second direction Y.

The black color filter CFN is disposed instead of the white color filter CFW in the example illustrated but may be disposed instead of any one of the red color filter CFR, the green color filter CFG and the blue color filter CFB. In other words, each pixel PX may comprise any two of the red color filter CFR, the green color filter CFG, and the blue color filter CFB, besides the white color filter CFW and the black color filter CFN.

According to the modified example, some of the main pixels PX comprise not N pixels but W pixels. For this reason, the display device DSP can improve the transmittance of the display panel PNL and can also improve the brightness of the image displayed on the main surface PMLa.

Figure 14:
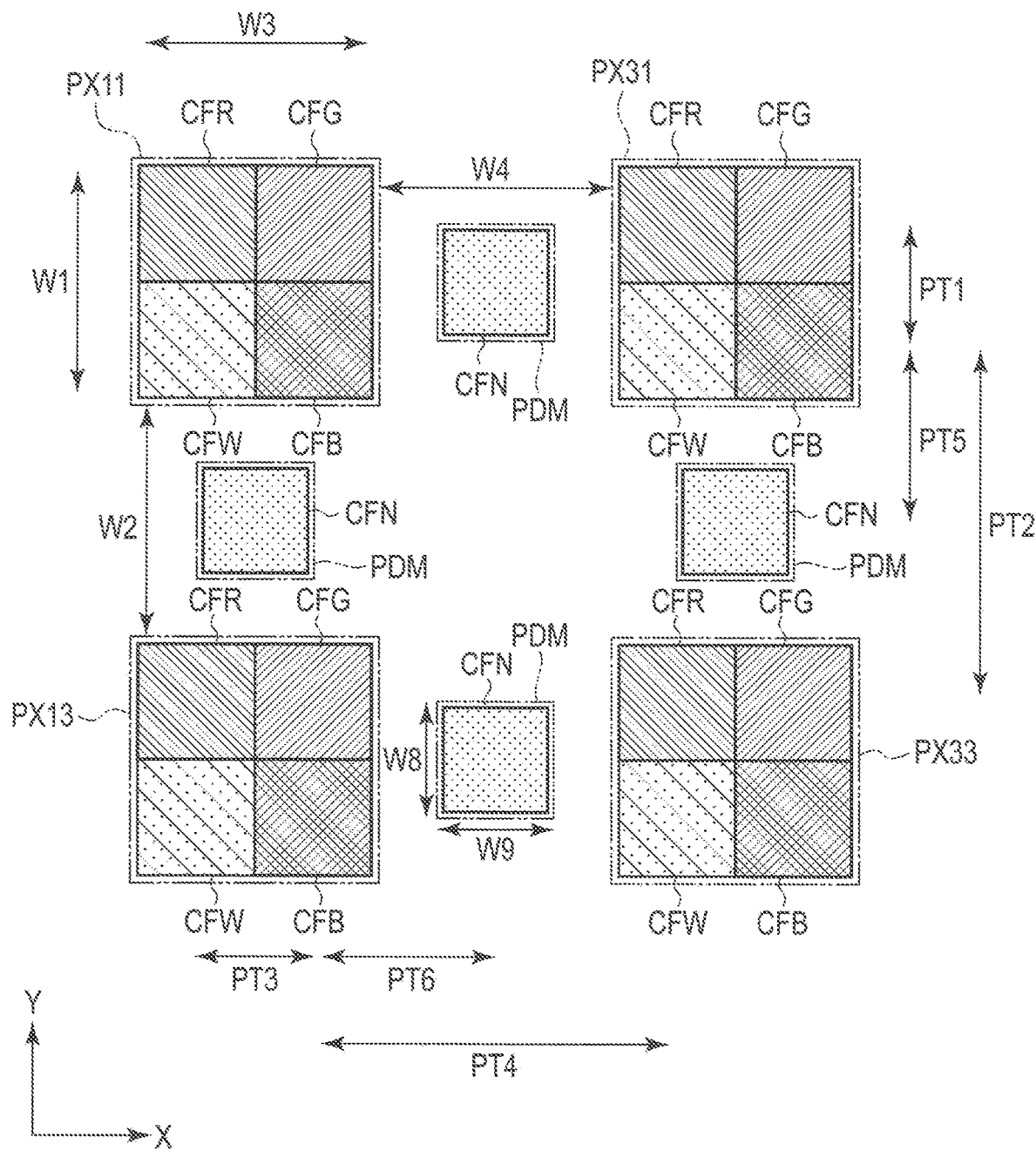
FIG. 14 is a diagram showing yet another arrangement example of the color filters.

FIG. 14 is a diagram showing yet another arrangement example of the color filters.

The configuration example illustrated is different from the configuration example shown in FIG. 9 with respect to features that the main pixel PX22 is not disposed and the main pixels PX are arrayed in a matrix and that all the black color filters CFN in the main pixels PX are replaced with the white color filters CFW. Each of the black color filters CFN is located between the main pixels PX.

Each of the main pixels PX11, PX31, PX13 and PX33 comprises the red color filter CFR, the green color filter CFG, and the blue color filter CFB, and also comprises the white color filter CFW instead of the black color filter CFN. A dummy pixel PDM at which the black color filter CFN is disposed is formed between the main pixels PX11 and PX31. Simultaneously, the dummy pixels PDM are formed between the main pixels PX13 and PX33, between the main pixels PX11 and PX13, and between the main pixels PX31 and PX33. From the viewpoint of improving the transmittance of the display panel PNL, the main pixels PX and the dummy pixels PDM are desirably disposed remote from each other and no color filters are desirably disposed in regions between the color filters and the black color filters CFN in the main pixels PX. The black color filter CFN is disposed between the main pixels PX in the first direction X or the second direction Y but the position of the black color filter CFN is not limited to this and, for example, the black color filter CFN may be disposed between the main pixels PX11 and PX33 in a direction which intersects the first direction X and the second direction Y.

From the viewpoint of suppressing the reduction in light transmittance of the display panel PNL, the area of the black color filter CFN is desirably smaller than a sum of the area of the red color filter CFR, the green color filter CFG and the blue color filter CFB in one main pixel PX. In other words, the dummy pixel PDM is desirably smaller than the main pixel PX. In addition, from the viewpoint of sufficiently lowering the visibility of the inverted image displayed on the main surface PNLb, the area of the black color filter CFN is desirably larger than or equal to the area of the smallest one of the red color filter CFR, the green color filter CFG and the blue color filter CFB in one main pixel PX.

Therefore, a width W8 of the dummy pixel PDM in the second direction Y is desirably smaller than the width W1 and also smaller than the interval W2. A width W9 of the dummy pixel PDM in the first direction X is desirably smaller than the width W3 and also smaller than the interval W4. It is assumed that the black color filter CFN and the color filters of the main pixel PX are adjacent in the second direction Y at a pitch PT5 and adjacent in the first direction X at a pitch PT6. At this time, the pitch PT5 is desirably greater than the pitch PT1 and the pitch PT6 is desirably greater than the pitch PT3.

In this arrangement example, too, the same advantages as those explained above can be obtained.

FIG. 15 is an illustration showing a configuration example of the color filters in the main pixel PX.

In the configuration example of the color filters, the configuration of the color filters in the main pixel PX is not particularly limited but the color filters may be disposed in a stripe state as illustrated in the present figure.

In the example illustrated, the red color filter CFR, the green color filter CFG and the blue color filter CFB extend in the second direction Y in a stripe shape and are arranged in the first direction X. The black color filter CFN or the white color filter CFW also extends in the second direction Y in a stripe shape and is adjacent to any one of the color filter CFR, the green color filter CFG and the blue color filter CFB in the first direction X.

The main pixel PX comprising the color filters in the above configuration can be applied to, for example, the arrangement examples shown in FIG. 9, FIG. 13 and FIG. 14. Four color filters are disposed in the main pixel PX in the arrangement examples, but the same advantages as those described above can be obtained even if three color filters are disposed in the main pixel PX. Next, an arrangement example in which the main pixel PX is constituted by three color filters will be explained.

Figure 16:
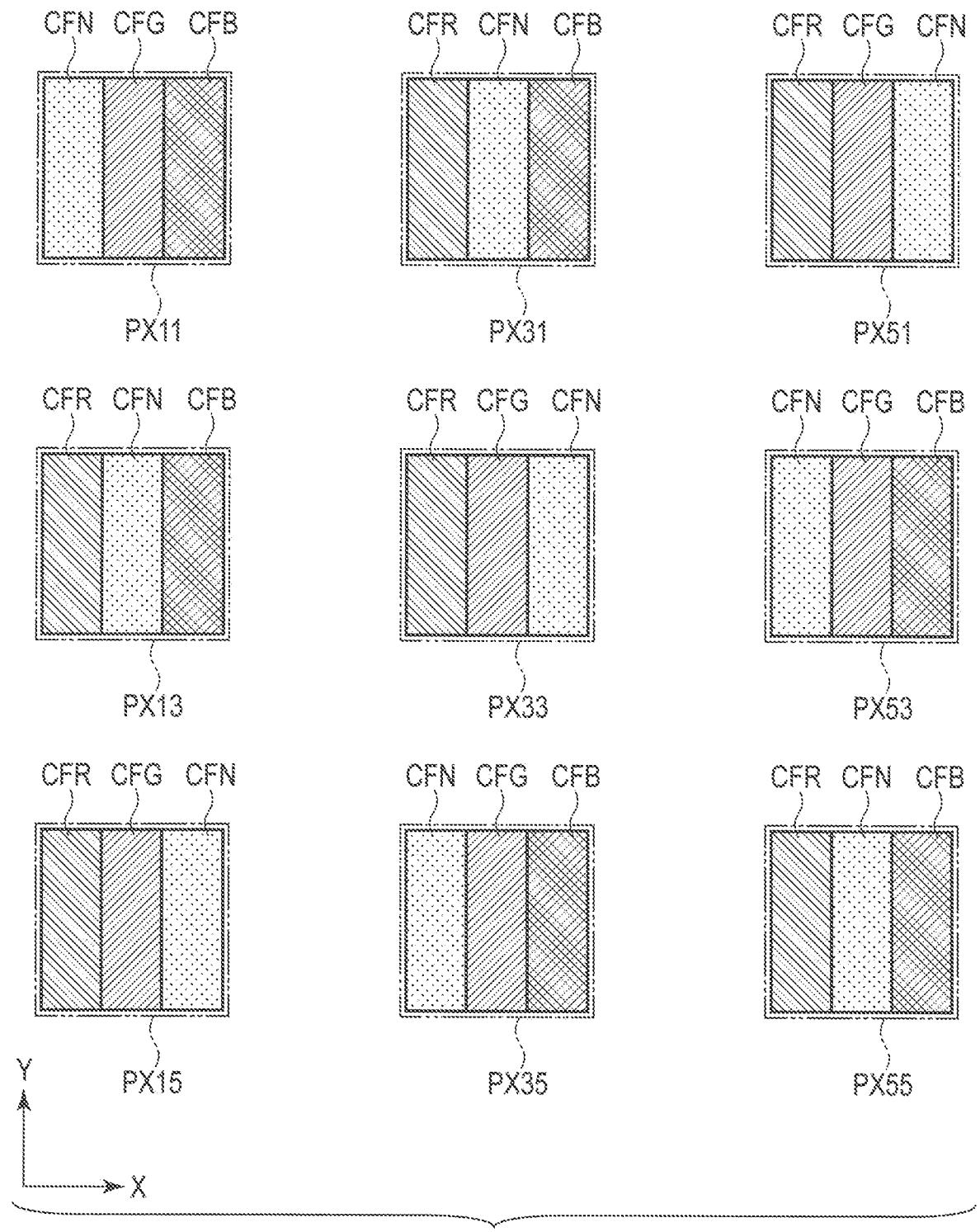
FIG. 16 is a diagram showing yet another arrangement example of the color filters.

FIG. 16 is a diagram showing yet another arrangement example of the color filters.

The arrangement example illustrated is different from the arrangement example shown in FIG. 9 with respect to features that the main pixels PX are arrayed in a matrix and that any three color filters of the red color filter CFR, the green color filter CFG, the blue color filter CFB, and the black color filter CFN are disposed in a stripe shape in each of the main pixels PX.

The main pixels PX11, PX31 and PX51 are arranged in this order in the first direction X and spaced apart from each other. Similarly, the main pixels PX13, PX33 and PX53 are arranged in this order in the first direction X and spaced apart from each other, and the main pixels PX15, PX35 and PX55 are arranged in this order in the first direction X and spaced apart from each other. The main pixels PX11, PX13 and PX15 are arranged in this order in the second direction Y and spaced apart from each other. Similarly, the main pixels PX31, PX33 and PX35 are arranged in this order in the second direction Y and spaced apart from each other, and the main pixels PX51, PX53 and PX55 are arranged in this order in the second direction Y and spaced apart from each other.

In the main pixel PX11, the black color filter CFN, the green color filter CFG and the blue color filter CFB are arranged in this order in the first direction X. In the main pixel PX31, the red color filter CFR, the black color filter CFN and the blue color filter CFB are arranged in this order in the first direction X. In the main pixel PX51, the red color filter CFR, the green color filter CFG and the black color filter CFN are arranged in this order in the first direction X. The main pixels PX13 and PX55 are constituted similarly to the main pixel PX31. The main pixels PX33 and PX15 are constituted similarly to the main pixel PX51. The main pixels PX53 and PX35 are constituted similarly to the main pixel PX11.

In other words, in the example illustrated, any one of the red color filter CFR, the green color filter CFG, and the blue color filter CFB is replaced with the black color filter CFN. The main pixel PX in which the green color filter CFG or the blue color filter CFB is replaced is disposed adjacent to the main pixel PX in which the red color filter CFR is replaced.

Figure 17:
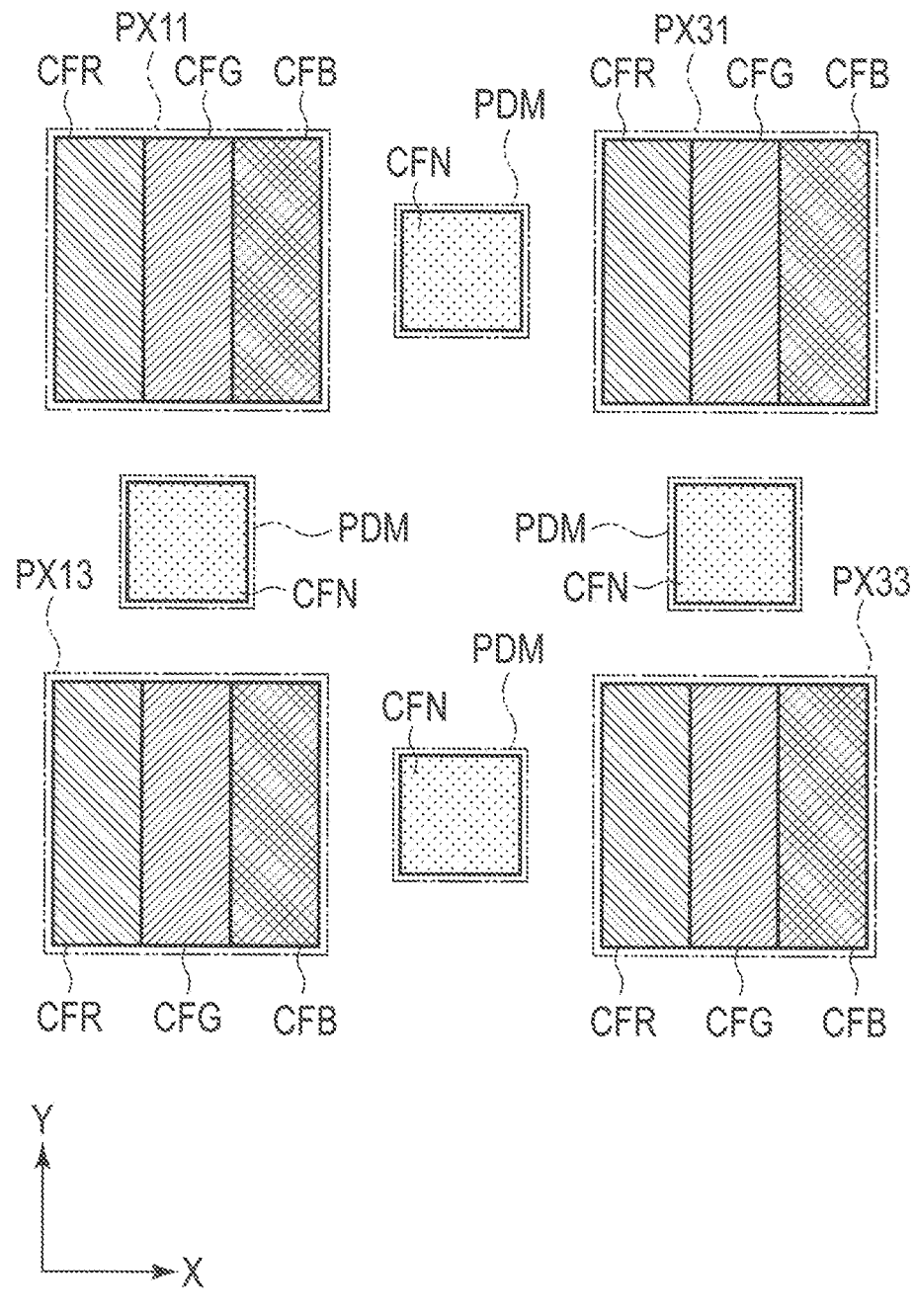
FIG. 17 is a diagram showing yet another arrangement example of the color filters.

FIG. 17 is a diagram showing yet another arrangement example of the color filters.

The arrangement example illustrated is different from the arrangement example shown in FIG. 9 with respect to three points explained below. First, the main pixels PX are arrayed in a matrix. Secondly, the red color filter CFR, the green color filter CFG, and the blue color filter CFB are disposed in a stripe state in each of the main pixels PX. Thirdly, the dummy pixel PDM is disposed between the main pixels PX.

In each of the main pixels PX, the red color filter CFR, the green color filter CFG and the blue color filter CFB extend in the second direction Y and are arranged in this order in the first direction X. The position, the size and the like of the black color filter CFN are the same as those in the arrangement example shown in FIG. 14.

In the present embodiment, since the display device DSP can use both the external light Lout and the illumination light Lin, the use efficiency of the illumination light Lin can be improved by appropriately changing the display modes. The display mode corresponds to, for example, a method of driving the light source unit LU or a display method using the main pixels PX. Next, a system for changing the display modes and examples of the respective display modes will be explained.

Figures 18, 19:
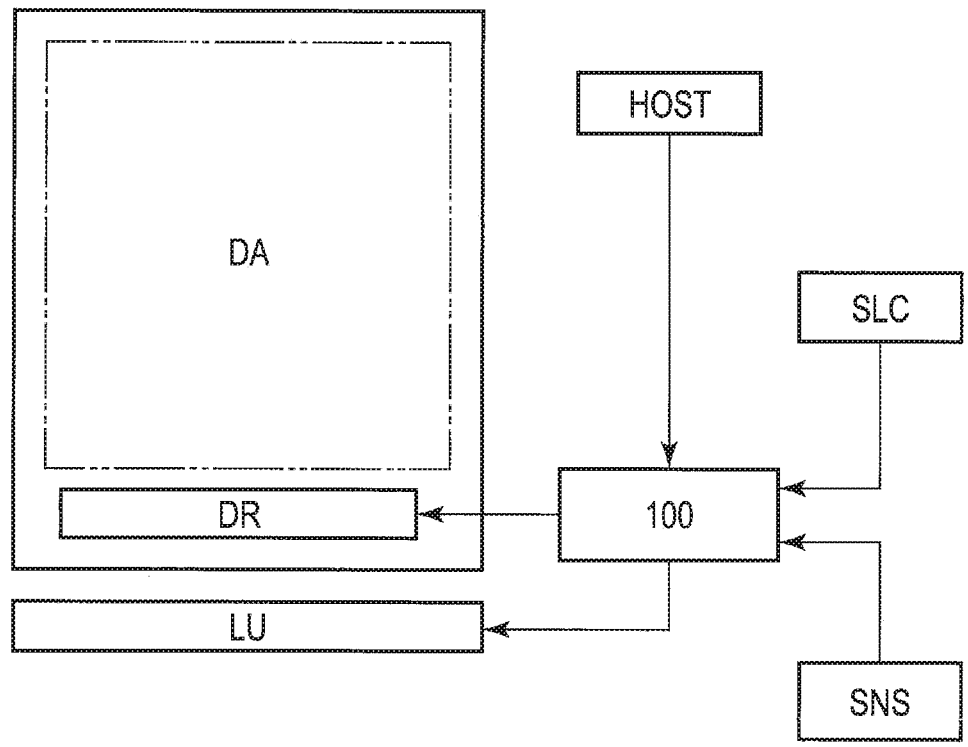
FIG. 18 is a block diagram showing a data flow for controlling change of the display modes of the display device DSP.
FIG. 19 is a table showing examples of the display modes of the display device DSP.

FIG. 18 is a block diagram showing a data flow for controlling change of the display modes of the display device DSP.

The display device DSP further comprises a host computer HOST, an external light sensor SNS, a selector SLC and a controller 100.

The host computer HOST transmits image data to the controller 100. The external light sensor SNS is a light sensor for detecting brightness and colors of the external light Lout and transmits obtained environmental light to the controller 100. The external light sensor SNS comprises, for example, a spectrometer for measuring spectrum of the external light Lout or an RGB brightness sensor for measuring the red component, the green component and the blue component of the external light Lout, separately. The RGB brightness sensor comprises, for example, a red sensor for measuring brightness of the external light Lout transmitted through the red color filter, a green sensor for measuring brightness of the external light Lout transmitted through the green color filter, and a blue sensor for measuring brightness of the external light Lout transmitted through the blue color filter. The selector SLC corresponds to a switch which can change select data to arbitrarily select the display modes by an observer or the like, and transmits the input select data to the controller 100.

The controller 100 executes signal processing such as conversion, correction and the like of the image data (RGB data) input from the host computer HOST. At this time, the controller 100 converts, for example, linear RGB data representing an RGB ratio of expression colors in the main pixel PX into gradation data representing luminance of the R pixel, the G pixel and the B pixel. The controller 100 may change, for example, the display modes in accordance with the environment data input from the external light sensor SNS. Alternately, the controller 100 may change the display modes in accordance with the select data input from the selector SLC. The image data processed in accordance with the respective display modes is transmitted from the controller 100 to the driver DR and the light source unit LU.

The controller 100 may execute signal processing to reduce power consumption at the light source unit LU and, for example, may execute signal processing to decompress the data of the scattering intensity in each main pixel PX, transmit the data to the driving module DR, execute signal processing to reduce the data of brightness of the light source unit LU by the extension of the scattering intensity, and transmit the data to the light source unit LU. In addition, if the main pixel PX comprises the W pixel, the controller 100 executes signal processing to allocate a common part of the RGB data to the W data representing the W pixel and execute signal processing to decompress the RGB data reduced by the content allocated to the W data while maintaining the proportion, when the RGB data is converted into the gradation data. The display device DSP can thereby improve the luminance of the main pixel PX.

The controller 100 may adjust a color temperature of the display image in accordance with the environment data. For example, if the external light Lout measured by the external light sensor SNS has a color tinged with yellow, the expression color of the main pixel PX may have a color tinged with yellow when the display device DSP is driven in the same manner as that in a case where the external light Lout is white light. In this case, the main pixel PX can be expressed in its original color by executing color correction to increase the luminance of the B pixel for the RGB data.

FIG. 19 is a table showing examples of the display modes of the display device DSP.

The table illustrated shows first to third display modes changed in accordance with the strength of brightness of the external light Lout. In this table, Mode 1 represents a first display mode, Mode 2 represents a second display mode and Mode 3 represents a third display mode. In addition, High represents a strong state of the external light Lout, Low represents a weak state of external light Lout, and 0 represents a very weak state or absence of the external light Lout. OFF represents turning off the light source unit LU and ON represents turning on the light source unit LU.

When the external light Lout is High, the display device DSP selects the first display mode. The display device DSP turns off the entire light source unit LU and displays the image by using the external light Lout alone. When the external light Lout is Low, the display device DSP selects the second display mode. The display device DSP turns on the light source unit LU and displays the image by using both the external light Lout and the illumination light Lin. At this time, the light source unit LU turns on all the R light source, the G light source and the B light source and functions as the white light source. When the external light Lout is 0, the display device DSP selects the third display mode. The light source unit LU displays the image by using the illumination light Lin alone by what is called field sequential (FCS) method of sequentially turning on the R light source, the G light source and the B light source. The method of turning on the light source unit LU in each display mode is not limited to this but, for example, the third display mode may be selected to sequentially turn on the R light source, the G light source and the B light source of the light source unit LU when the external light Lout is Low or the second display mode may be selected to turn on all the R light source, the G light source and the B light source of the light source unit LU when the external light Lout is 0.

FIG. 20 is a diagram for explanation of behavior of the display device DSP in the second display mode shown in FIG. 19.

The present figure shows the main pixel PX which contributes to the display of the image on the main surface PNLa.

The external light Lout and the illumination light Lin of white light LW are made incident on the light modulating layer OM. The external light Lout and the illumination light Lin are scattered on the light modulating layer OM at a position corresponding to the red color filter CFR, transmitted through the red color filter CFR and emitted from the main surface PNLa as the red light LR. Simultaneously, the scattered external light Lout and illumination light Lin are emitted from the main surface PNLb as pale red light LWr. Simultaneously, the external light Lout and the illumination light Lin are scattered on the light modulating layer OM at a position corresponding to the green color filter CFG, emitted from the main surface PNLa as the green light LG and emitted from the main surface PNLb as pale green light LWg. In addition, the external light Lout and the illumination light Lin are scattered on the light modulating layer OM at a position corresponding to the blue color filter CFB, emitted from the main surface PNLa as the blue light LB and emitted from the main surface PNLb as pale blue light LWb.

The external light Lout and the illumination light Lin scattered on the light modulating layer OM at a position corresponding to the black color filter CFN are emitted from the main surface PNLb as the white light LW and are not emitted from the main surface PNLa.

FIG. 21 is a diagram for explanation of behavior of the display device DSP in the second display mode shown in FIG. 19.

The present figure shows the main pixel PX which does not contribute to the display of the image on the main surface PNLa. The light modulating layer OM may be in the scattering mode at the position corresponding to the black color filter CFN, similarly to the case shown in FIG. 20. The external light Lout and the illumination light Lin are thereby emitted from the main surface PNLb as the white light LW.

As described above, the dummy pixel can emit the white light from the main surface PNLb irrespective of the display state of the main pixel PX.

Figure 22:
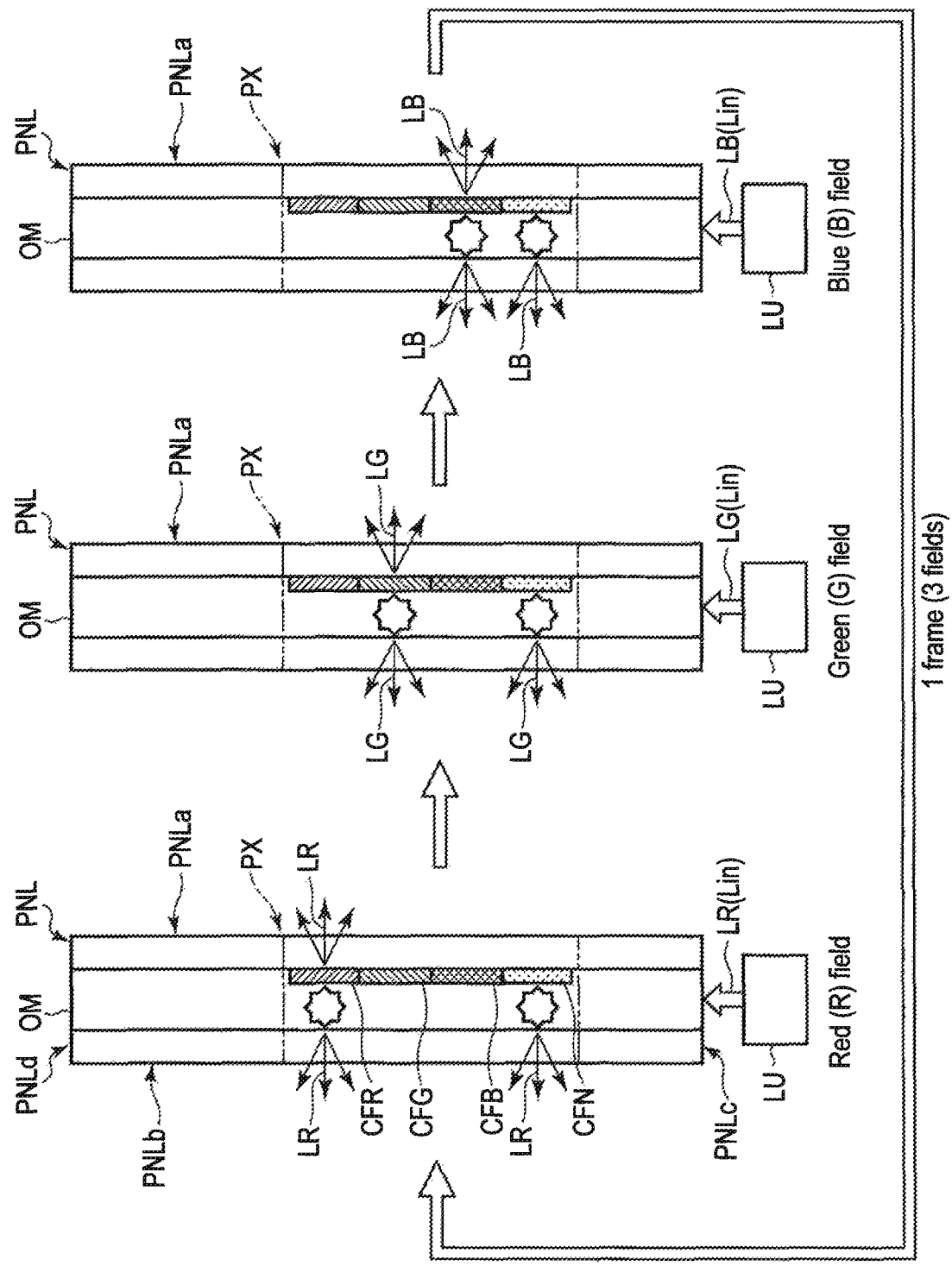
FIG. 22 is a diagram for explanation of behavior of the display device DSP in a third display mode shown in FIG. 19.

FIG. 22 is a diagram for explanation of behavior of the display device DSP in the third display mode shown in FIG. 19.

In the FCS method, one frame corresponding to a period of displaying one image is divided into a plurality of periods (fields). The display device DSP sets sub-pixels of colors different in the respective fields to be in the scattering mode, the colors of the fields expressed in one frame are synthesized and visually recognized as the color of the main pixel PX by an observer. In the example illustrated, the display device DSP divides one frame into three fields, and sequentially drives a red (R) field in which the R pixel is driven, a green (G) field in which the G pixel is driven, and a blue (B) field in which the B pixel is driven, in this order. A black (B) field in which none of the sub-pixels is driven or a white (W) field in which all the sub-pixels are driven may be inserted at the start or end of one frame. Color mixing between the frames can be suppressed by driving the B or W field before and after the RGB field.

Next, driving in each of the R, G, and B fields will be explained.

In the R field, the light source unit LU emits the illumination light Lin of the red light LR. In the R field, the illumination light Lin is emitted from the main surfaces PNLa and PNLb as the red light LR by setting the R pixel at the position corresponding to the red color filter CFR to be the scattering mode. In addition, the dummy pixel of the position of the black color filter CFN may also be set in the scattering mode and the illumination light Lin is emitted from the main surface PNLb alone as the red light LR, in the dummy pixel. The scattering intensity of the light modulating layer OM in the dummy pixel may be different from the scattering intensity of the light modulating layer OM in the R pixel. In other words, the luminance of the red light LR emitted from the dummy pixel may be different from the luminance of the red light LR emitted from the R pixel, on the main surface PNLb. In addition, the dummy pixel can be set in the scattering mode even if the R field does not contribute to the display of the image on the main surface PNLa. In other words, the red light LR can be emitted from the main surface PNLb, in the R field which does not contribute to the display of the image.

In the G field, too, the illumination light Lin of the green light LG can be emitted from the light source unit LU, and the dummy pixel and the G pixel corresponding to the position corresponding to the green color filter CFG can be set in the scattering mode, similarly to the R field. The scattered illumination light Lin is thereby emitted from the main surfaces PNLa and PNLb as the green light LG. In the B field, too, the illumination light Lin of the blue light LB can be emitted from the light source unit LU, and the dummy pixel and the B pixel corresponding to the position corresponding to the blue color filter CFB can be set in the scattering mode, similarly to the R field. The scattered illumination light Lin is thereby emitted from the main surfaces PNLa and PNLb as the blue light LB.

If the W field is prepared in one frame, the light source unit LU turns on all the R light source, the G light source and the B light source and emits the white light in the W field. Then, the R pixel, the B pixel, and G pixel are set in the scattering mode, and the white light is emitted from the main surface PNLa. At this time, the white light is emitted from the main surface PNLb even if the dummy pixel is set in the scattering mode or the transmission mode. If the B field is prepared in one frame, the light source unit LU is turned off in the B field.

In the third display mode as explained above, loss of the scattered illumination light Lin caused by absorption, at the red color filter CFR, the green color filter CFG, and the blue color filter CFB, can be reduced. In other words, the use efficiency of the light of the light source unit LU can be improved. In addition, the illumination light Lin is scatted in the regions corresponding to the R pixel and the dummy pixel alone and is not consumed in the regions corresponding to the G pixel and the B pixel, in the R field. In the G field and the B field, too, since consumption of the illumination light Lin can be suppressed similarly, the display device DSP can suppress the reduction in brightness of the illumination light Lin on the side surface PNLd and also suppress the non-uniformity in display.

The main pixel PX may further comprise the W pixel. The W pixel can improve the luminance in each field by setting the scattering mode in each field. In addition, since the W pixel exhibits the white light as seen in one frame by setting the scattering mode in all the fields, the W pixel can improve the luminance of the main pixel PX.

Figure 23:
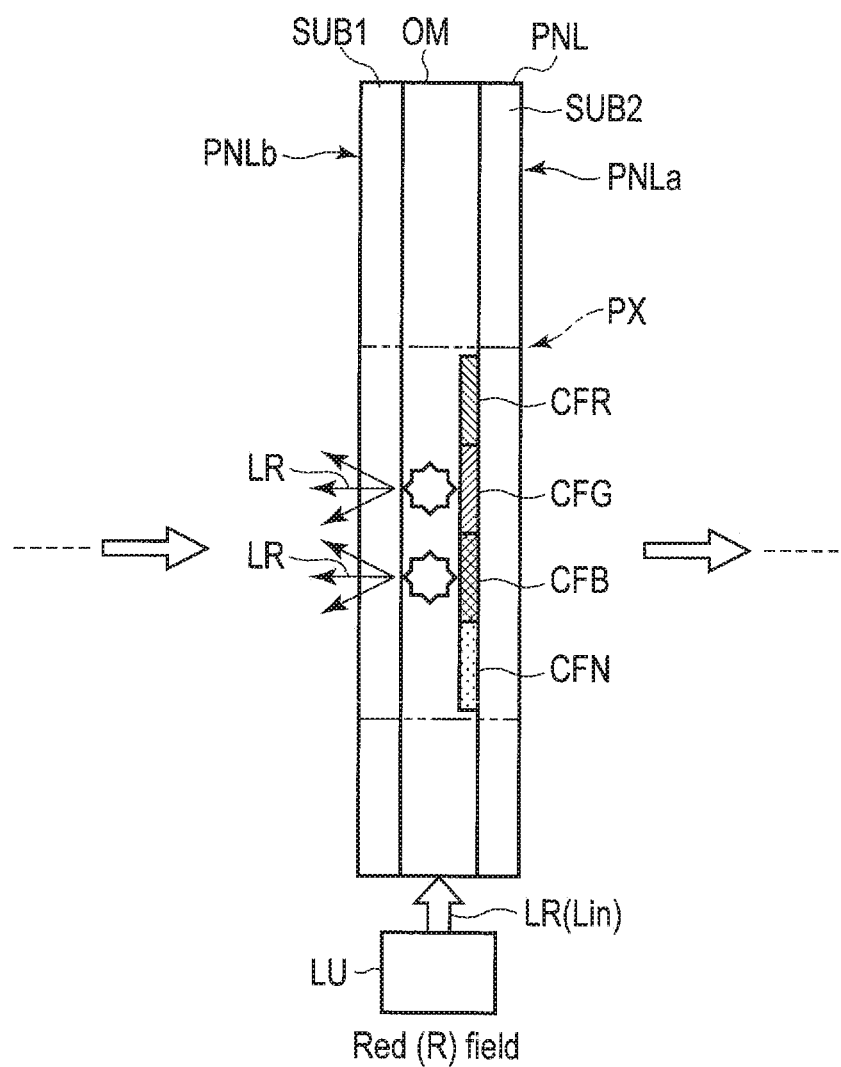
FIG. 23 is a diagram showing an applied example of the third display mode explained with reference to FIG. 22.

FIG. 23 is a diagram showing an applied example of the third display mode explained with reference to FIG. 22.

In this figure, the R field alone is shown but the G field or the B field is not shown. The G field and the B field are similar to the R field. In the present displaying method, too, the image is displayed by sequentially driving the R, G, and B fields, similarly to the method explained with reference to FIG. 19. In the example illustrated, the display device DSP sets the G pixel and the B pixel in the R field in the scattering mode and urges the illumination light Lin of the red light LR to be scattered. The illumination light Lin scattered toward the main surface PNLa is absorbed into the green color filter CFG and the blue color filter CFB. In contrast, the illumination light Lin scattered toward the main surface PNLb is emitted from the main surface PNLb. Similarly to this, the light can be emitted from the main surface PNLb without emitting the light from the main surface PNLa, in the G field and the B field, too. In other words, according to this displaying method, the main pixel PX can exhibit different colors on the main surfaces PNLa and PNLb and, for example, the display device DSP can display the image not on the main surface PNLa side but on the main surface PNLb side alone.

FIG. 24 is a table showing colors of light emitted from a light source 23 and colors which can be expressed with the emitted light by the display device DSP.

The expression in the table indicates the colors obtained after the illumination light Lin emitted from the light sources are transmitted through the red color filter CFR, the green color filter CFG, and the blue color filter CFB. OFF means a case where the illumination light Lin is not transmitted through the color filters but becomes the black display.

If the FCS method is employed, the light source unit LU is not limited to a combination of the R light source, the G light source and the B light source if the combination of the light sources can express red, green and blue by allowing the light to be transmitted through the red color filter CFR, the green color filter CFG and the blue color filter CFB. The light source unit LU is not limited to the combination of three light sources but may be a combination of two light sources.

The R light source, the G light source and the B light source can express red, green and blue, respectively. A Y light source which emits yellow (Y) light can express red and green. An M light source which emits magenta (M) light can express red and blue. A C light source which emits cyan (C) light can express green and blue. The light source unit LU therefore may be a combination of the Y light source and the B light source, a combination of the M light source and the G light source or a combination of the C light source and the R light source. In addition, the light source unit LU may also be a combination of the Y light source and the M light source, a combination of the M light source and the C light source or a combination of the C light source and the Y light source.

The Y light source is composed of, for example, a green LED which emits green light and a red phosphor which absorbs the green light and emits the red light. The M light source is composed of, for example, a blue LED which emits blue light and a red phosphor which absorbs the blue light and emits the red light. The C light source is composed of, for example, a blue LED which emits blue light and a green phosphor which absorbs the blue light and emits the green light. However, the Y light source may simultaneously turn on the green LED and the red LED, the M light source may simultaneously turn on the blue LED and the red LED, and the C light source may simultaneously turn on the blue LED and the green LED.

Figure 25:
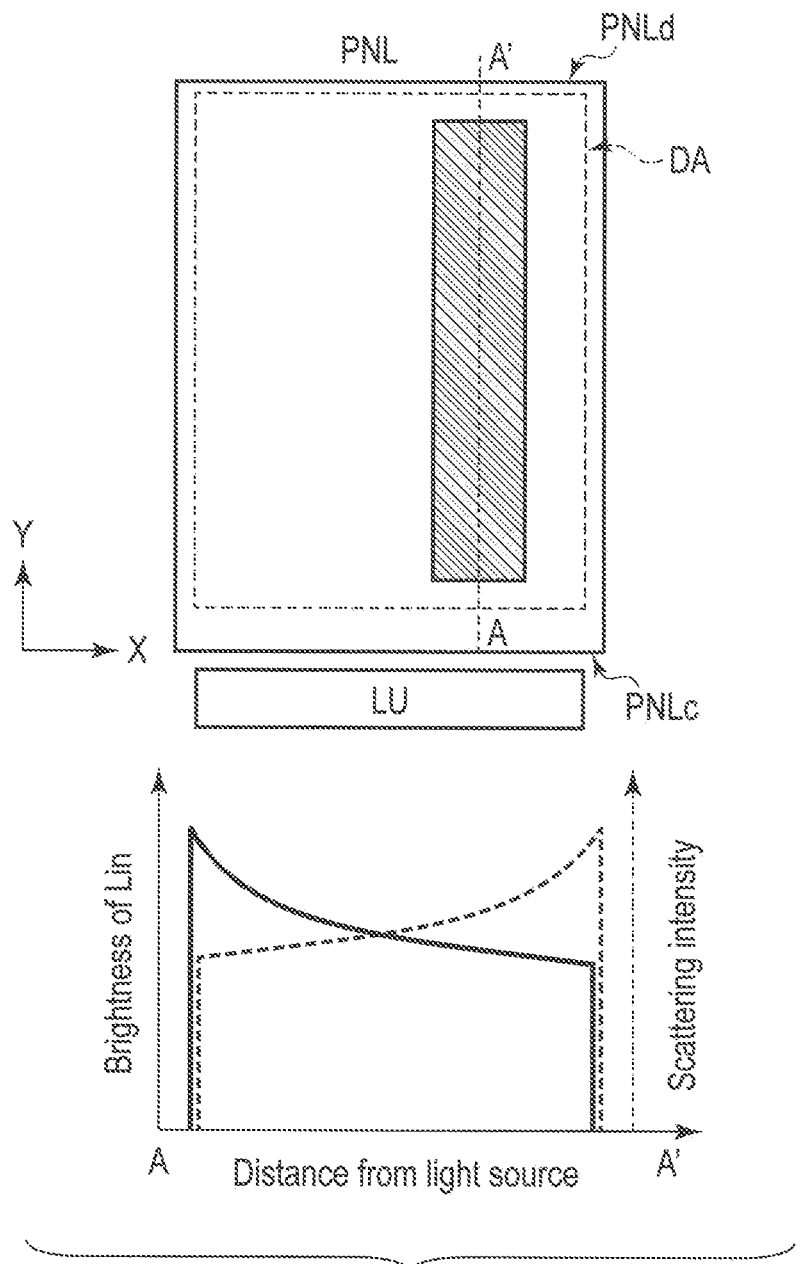
FIG. 25 is an illustration for explanation of correction of scattering intensity.

FIG. 25 is an illustration for explanation of correction of scattering intensity.

In the display area DA, the brightness of the illumination light Lin is high at a position close to the side surface PNLc which is the side close to the light source unit LU, and the brightness of the illumination light Lin is low at a position close to the side surface PNLd which is the side remote from the light source unit LU. This is because the illumination light Lin is consumed by scattering in the light modulating layer OM as explained above.

An image is assumed to be displayed in a region of a hatch pattern of the display panel PNL. A solid line in the graph illustrated indicates reduction in brightness of the illumination light Lin along line A-A' in the light modulating layer OM. Point A is located at an end portion of the display area DA on a side close to the side surface PNLc, and point A' is located at an end portion of the display area DA on a side close to the side surface PNLd. A dotted line in the graph illustrated indicates correction of the scattering intensity of the light modulating layer OM along line A-A', which is necessary to uniform the brightness in the region of the hatch pattern. If the display panel PNL is set in the scattering mode by forming the electric field in the light modulating layer OM, correction of the scattering intensity is executed by adjusting a gradation value of the voltage applied to the electrode which forms the electric field in the light modulating layer OM. This gradation value is set to be lower than a maximum value at a position close to point A, higher as the value is close to point A' and maximum at point A'. The display device DSP can thereby suppress the non-uniformity in display which results from the lack of brightness in close vicinity to the side surface PNLd.

Figure 26:
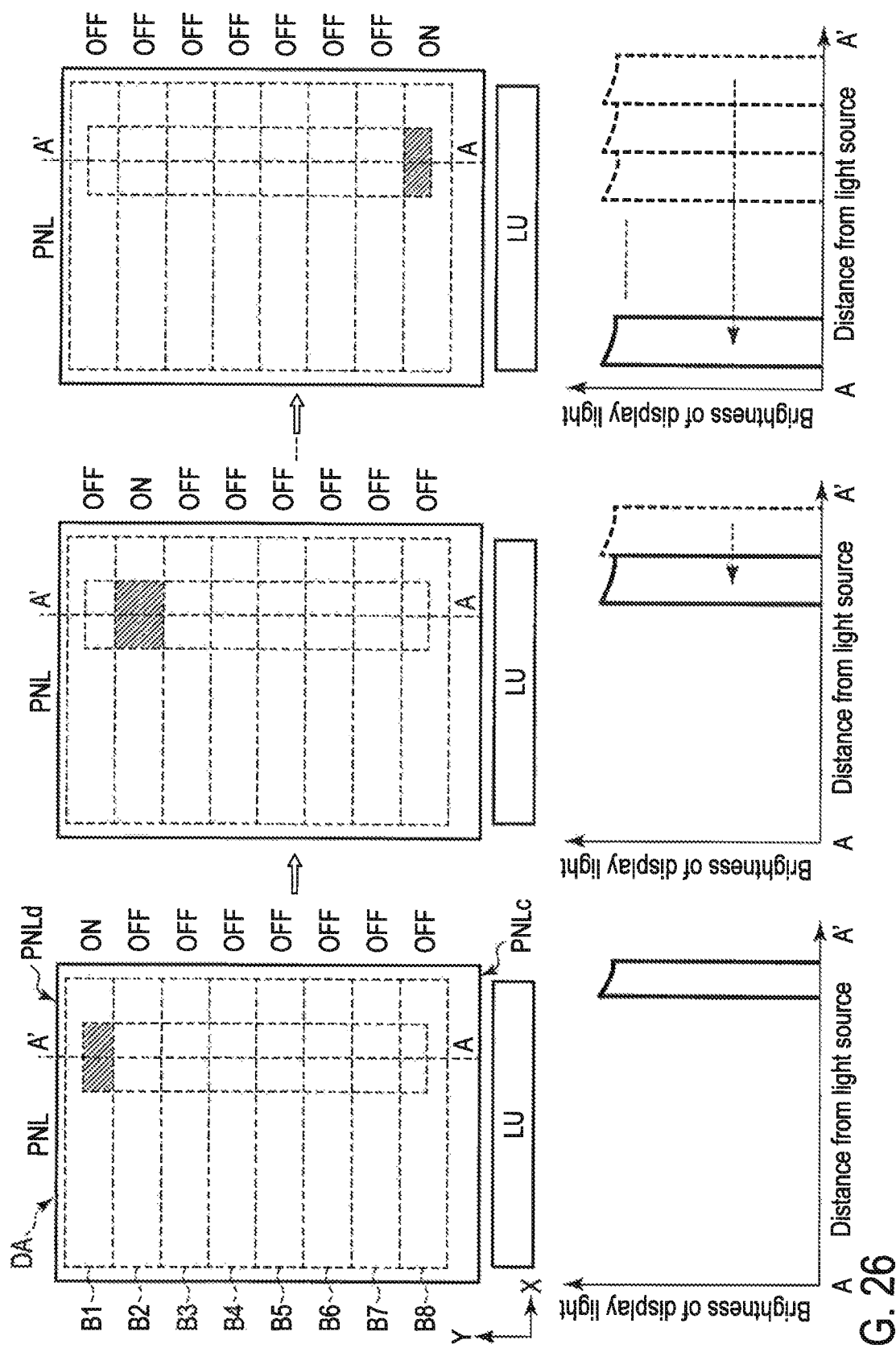
FIG. 26 is an illustration for explanation of scan drive.

FIG. 26 is an illustration for explanation of scan drive.

Uniformity of the brightness in the display area DA can also be implemented by scan drive. The scan drive is to divide the display area DA into, for example, blocks arranged in the second direction Y and sequentially execute driving in the blocks.

In the example illustrated, the display area DA is divided into eight blocks B1 to B8. The blocks B1 to B8 are arranged in this order in the second direction Y from a position closer to the side surface PNLd. The number of blocks is not particularly limited but may be seven or less and nine or more. The non-uniformity in display can be suppressed by increasing the number of blocks, and the drive frequency of the display device DSP can be reduced by decreasing the number of blocks. The suitable number of blocks is therefore appropriately selected in accordance with the design of the display device DSP and the like.

In the example illustrated, first, the main pixel PX disposed in block B1 alone is set in the scattering mode and a part of the image is displayed in block B1. At this time, since the main pixels PX disposed in blocks B2 to B8 are in the transmission mode, the illumination light Lin can be guided to block B1 while suppressing the reduction in brightness of the illumination light Lin. Next, the main pixel PX disposed in block B2 alone is set in the scattering mode and a part of the image is displayed in block B2. After that, the main pixels PX disposed in blocks B3 to B8 are sequentially set in the scattering mode and parts of the image are displayed in blocks B3 to B8. The parts of the image displayed in respective blocks B1 to B8 are combined and visually recognized as one image by an observer.

According to the scan drive, occurrence of the non-uniformity in display can be suppressed since the reduction in brightness caused by scattering of the illumination light Lin occurs in the only regions corresponding to respective blocks B1 to B8. In addition, the brightness of the display image can be increased since the luminance of the main pixels PX does not need to be suppressed by correction of the scattering intensity.

Figure 27:
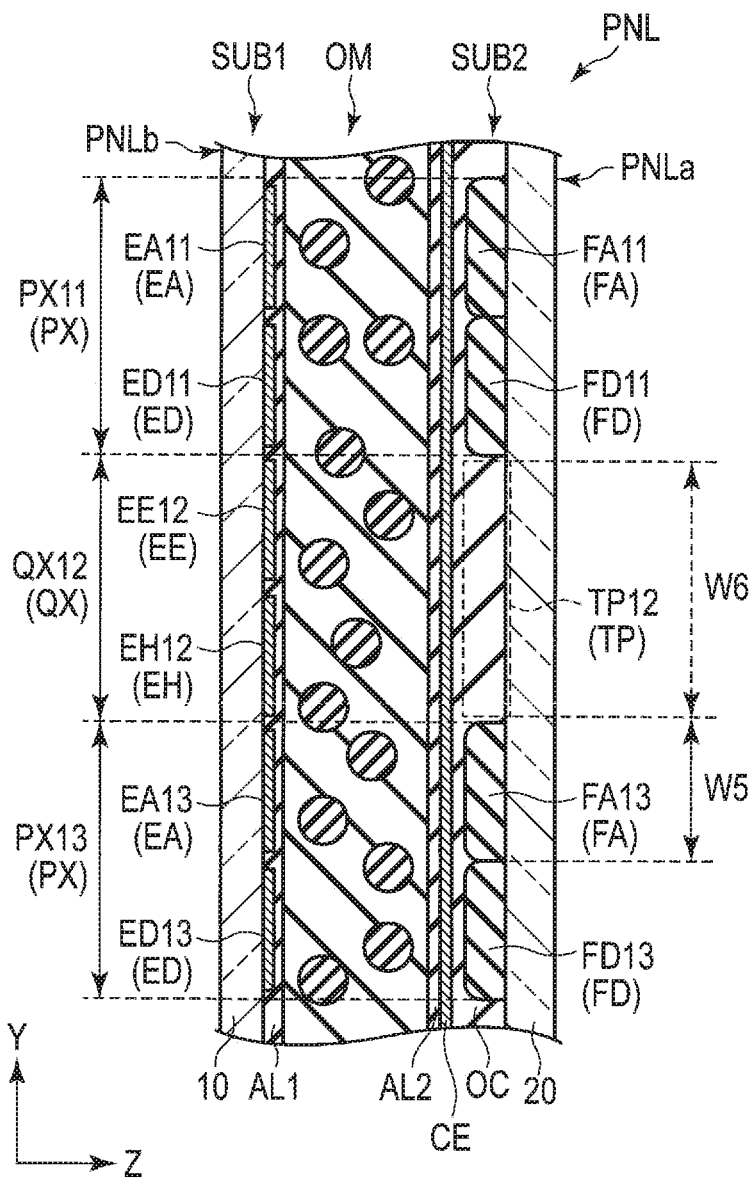
FIG. 27 is a diagram showing a first modified example of the display device DSP of the present embodiment.

FIG. 27 is a diagram showing a first modified example of the display device DSP of the present embodiment.

The present modified example is different from the configuration example shown in FIG. 3 with respect to a feature of comprising the electrodes EE12 and EH12 in a region between the main pixels PX11 and PX13.

A quasi-pixel QX12 (QX) is formed between the main pixels PX11 and PX13. The quasi-pixel QX has a configuration similar to the main pixel PX and, for example, comprises a transparent member TP instead of the color filters FA to FD. The transparent member TP is formed of, for example, uncolored resin which allows white light to be transmitted. The transparent member TP may have a pale color to adjust the taste of color of the display panel PNL when no images are displayed.

The electrodes EE12 and EH12 and the transparent member TP12 are disposed in a region corresponding to the quasi-pixel QX12. The electrodes EE12 and EH12 are located between the electrodes ED11 and EA13 and adjacent to each other in the second direction Y. The electrode EE12 is adjacent to the electrode ED11 in the second direction Y and the electrode EH12 is adjacent to the electrode EA13 in the second direction Y. The size of each of the electrodes EE12 and EH12 is equal to, for example, the electrode EA13 but may be larger or smaller than the size of the electrode EA13.

The transparent member TP12 is located between the color filters FD11 and FA13 and opposed to the electrodes EE12 and EH12 in the third direction Z. The transparent member TP12 is disposed over the entire surface of the region corresponding to the quasi-pixel QX12. The transparent member TP12 is in contact with the color filters FD11 and FA13 in the second direction Y. The transparent member TP12 is larger than the color filter FA13. A width W6 of the transparent member TP12 in the second direction Y is larger than a width W5 of the color filter FA13 in the second direction Y, for example, approximately twice as large as the width W5. The transparent member TP12 is formed of, for example, the overcoat layer OC.

The quasi-pixel QX12 modulates a light scattering property of the region corresponding to the region opposed to the electrode EE12 of the light modulating layer OM in accordance with the electric field generated between the electrode EE12 and the common electrode CE. In addition, the quasi-pixel QX12 modulates a light scattering property of the region corresponding to the region opposed to the electrode EH12 of the light modulating layer OM in accordance with the electric field generated between the electrode EH12 and the common electrode CE. The light scattered in the regions which are opposed to the electrodes EE12 and EH12, respectively, is emitted from the main surfaces PNLa and PNLb. Therefore, the display device DSP can reduce the transparency of the display panel PNL and improve the display quality of the image in a case where the external light is strong. In addition, the brightness of the image can be improved by using the quasi-pixel QX as the W pixel.

Figure 28:
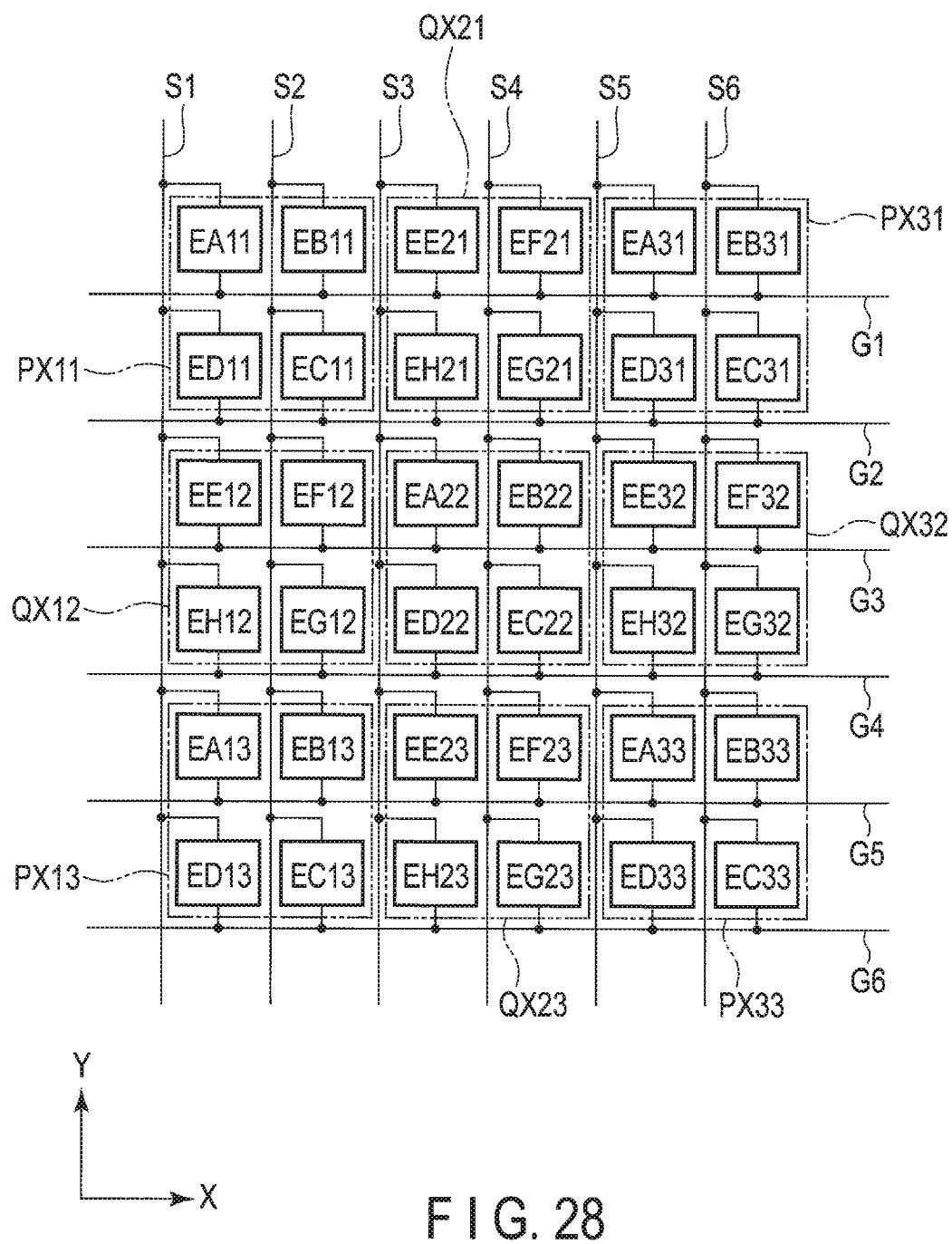
FIG. 28 is a diagram showing a configuration example of a first substrate SUB1 shown in FIG. 27.

FIG. 28 is a diagram showing a configuration example of a first substrate SUB1 shown in FIG. 27.

The configuration example illustrated is different from the configuration example shown in FIG. 10 with respect to a feature that the quasi-pixels QX are disposed. Each quasi-pixel QX is disposed between the main pixels PX, and the main pixels PX and the quasi-pixels QX are alternately arranged in the first direction X and the second direction Y. Each quasi-pixel QX comprises pixel electrodes EE, EF, EG and EH.

The electrodes EF12 and EG12 of the quasi-pixel QX12 are located between the electrodes EC11 and EB13. The electrode EF12 is adjacent to the electrode EE12 in the first direction X and adjacent to the electrode EC11 in the second direction Y. The electrode EG12 is adjacent to the electrode EH12 in the first direction X and adjacent to the electrodes EF12 and EB13 in the second direction Y.

The quasi-pixel QX21 located between the main pixels PX11 and PX31 in the first direction X comprises the electrodes EE21, EF21, EG21 and EH21. The electrode EE21 is located between the electrodes EB11 and EF21 in the first direction X and the electrode EF21 is located between the electrodes EE21 and EA31 in the first direction X. The electrode EH21 is located between the electrodes EC11 and EG21 in the first direction X and the electrode EG21 is located between the electrodes EH21 and ED31 in the first direction X.

The electrodes EE12 and EH12 are supplied with data signals by the data line S1. The electrodes EF12 and EG12 are supplied with data signals by the data line S2. The electrodes EE21 and EH21 are supplied with data signals by the data line S3. The electrodes EF21 and EG21 are supplied with data signals by the data line S4. Driving the electrodes EE21 and EF21 is controlled by the scanning line G1. Driving the electrodes EG21 and EH21 is controlled by the scanning line G2. Driving the electrodes EE12 and EF12 is controlled by the scanning line G3. Driving the electrodes EG12 and EH32 is controlled by the scanning line G4.

The quasi-pixel QX32 located between the main pixels PX31 and PX33 in the second direction Y comprises the electrodes EE32, EF32, EG32 and EH32, similarly to the quasi-pixel QX12. The quasi-pixel QX23 located between the main pixels PX13 and PX33 in the first direction X comprises the electrodes EE23, EF23, EG23 and EH23, similarly to the quasi-pixel QX21.

If the quasi-pixel QX is located between the main pixels, its layout is not particularly limited but, for example, the quasi-pixel QX may be disposed between the main pixels PX in the arrangement example shown in FIG. 13 and FIG. 16. In addition, if the quasi-pixel QX is added to the arrangement example shown in FIG. 14 and FIG. 17, the position of the quasi-pixel QX is not limited to that between the main pixels PX and the quasi-pixel QX may be disposed between the main pixel PX and the dummy pixel PDM or between the dummy pixels PDM.

FIG. 29 is a diagram showing a second modified example of the display device DSP of the present embodiment.

The present modified example is different from the modified example shown in FIG. 27 with respect to a feature that an electrode EI12 is disposed in a region corresponding to the quasi-pixel QX. The electrode EI12 is opposed to the entire surface of the transparent member TP in the third direction X and disposed between the electrodes ED11 and EA13. The electrode EI12 is adjacent to the electrodes ED11 and EA13 in the second direction Y.

In the present modified example, too, the same advantages as those of the first modified example can be obtained.

Figure 30:
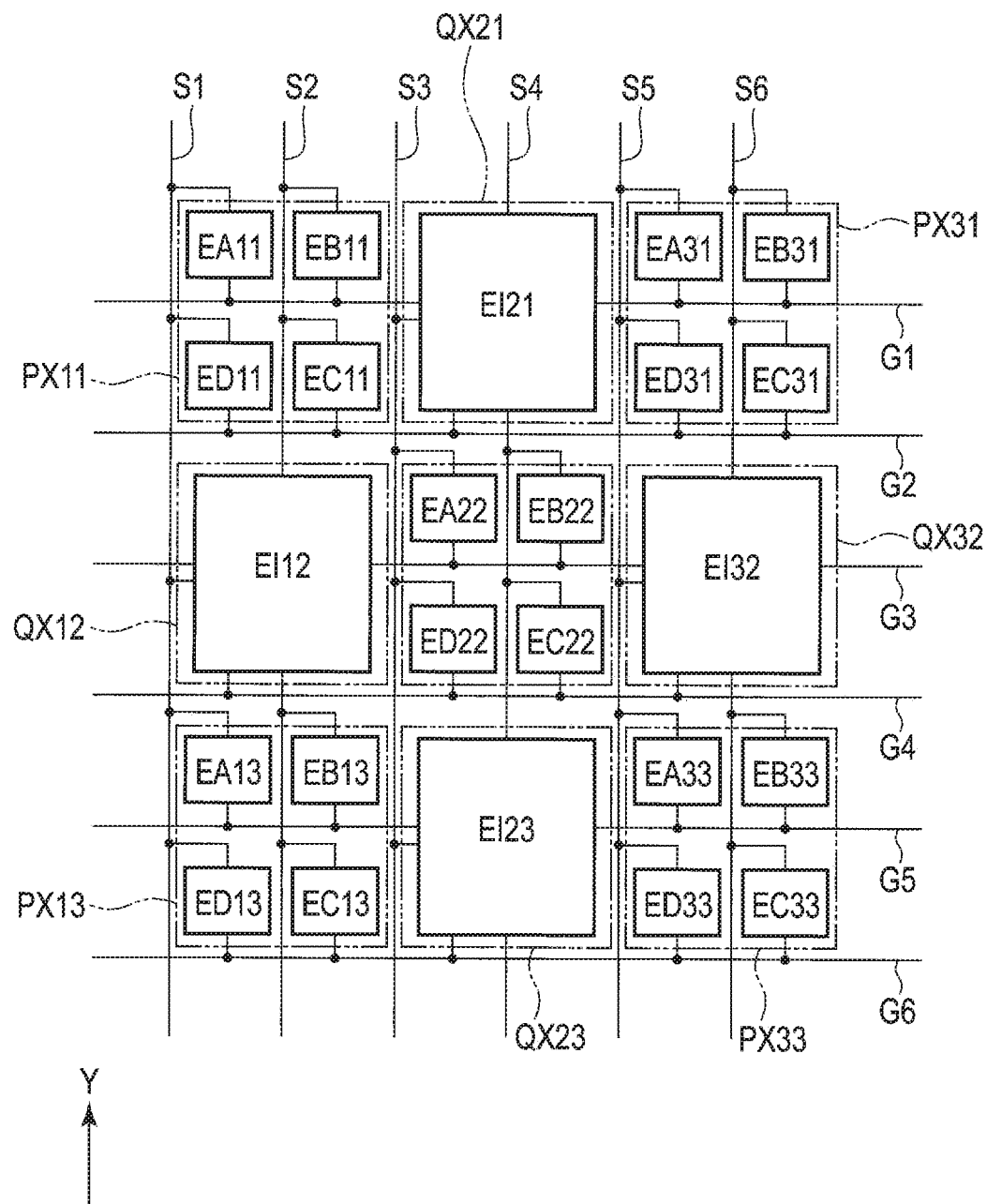
FIG. 30 is a diagram showing a configuration example of the first substrate SUB1 shown in FIG. 29.

FIG. 30 is a diagram showing a configuration example of the first substrate SUB1 shown in FIG. 29.

The present configuration example is different from the configuration example shown in FIG. 28 with respect to a feature that electrodes EI12, EI21, EI32 and EI23 are disposed.

The electrode EI12 of the quasi-pixel QX12 is disposed in the entire region corresponding to the quasi-pixel QX12, and extends not only between the electrodes ED11 and EA13 but also between the electrodes EC11 and EB13. The electrode EI21 of the quasi-pixel QX21 is disposed in the entire region corresponding to the quasi-pixel QX21, and extends not only between the electrodes EB11 and EA31 but also between the electrodes EC11 and ED31.

The electrode EI12 is supplied with a data signal by the data line S1 and its drive is controlled by the scanning line G4. The electrode EI21 is supplied with a data signal by the data line S3 and its drive is controlled by the scanning line G2.

The electrode EI32 of the quasi-pixel QX32 comprises the electrode EI32, similarly to the quasi-pixel QX12. The electrode EI23 of the quasi-pixel QX23 comprises the electrode EI23, similarly to the quasi-pixel QX21.

FIG. 31 is a diagram showing a third modified example of the display device DSP of the present embodiment.

The display panel PNL illustrated is what is called a passive-matrix type display panel comprising column electrodes C (C1, C2, . . . , Cp) and row electrodes L (L1, L2, . . . , Lq). The column electrodes C extend in the second direction Y and are arranged in the first direction X. The row electrodes L extend in the first direction X and are arranged in the second direction Y. The column electrodes C are electrically connected to a first driver Dr1 while the row electrodes L are electrically connected to a second driver Dr2.

Regions in which the column electrodes C and the row electrodes L intersect to be opposed to each other operate as sub-pixels. For example, a region in which the column electrode C1 and the row electrode L1 are opposed to each other corresponds to a sub-pixel PA11. A region in which the column electrode C2 and the row electrode L1 are opposed to each other corresponds to a sub-pixel PB11. A region in which the column electrode C2 and the row electrode L2 are opposed to each other corresponds to a sub-pixel PC11. A region in which the column electrode C1 and the row electrode L2 are opposed to each other corresponds to a sub-pixel PD11.

In this modified example, too, the same advantages as those explained example can be obtained.

Next, a second embodiment will be described. A display device DSP of the second embodiment is different from the display device DSP of the first embodiment with respect to features that dummy pixels are not disposed and that the display mode is limited to FCS mode.

Figure 32:
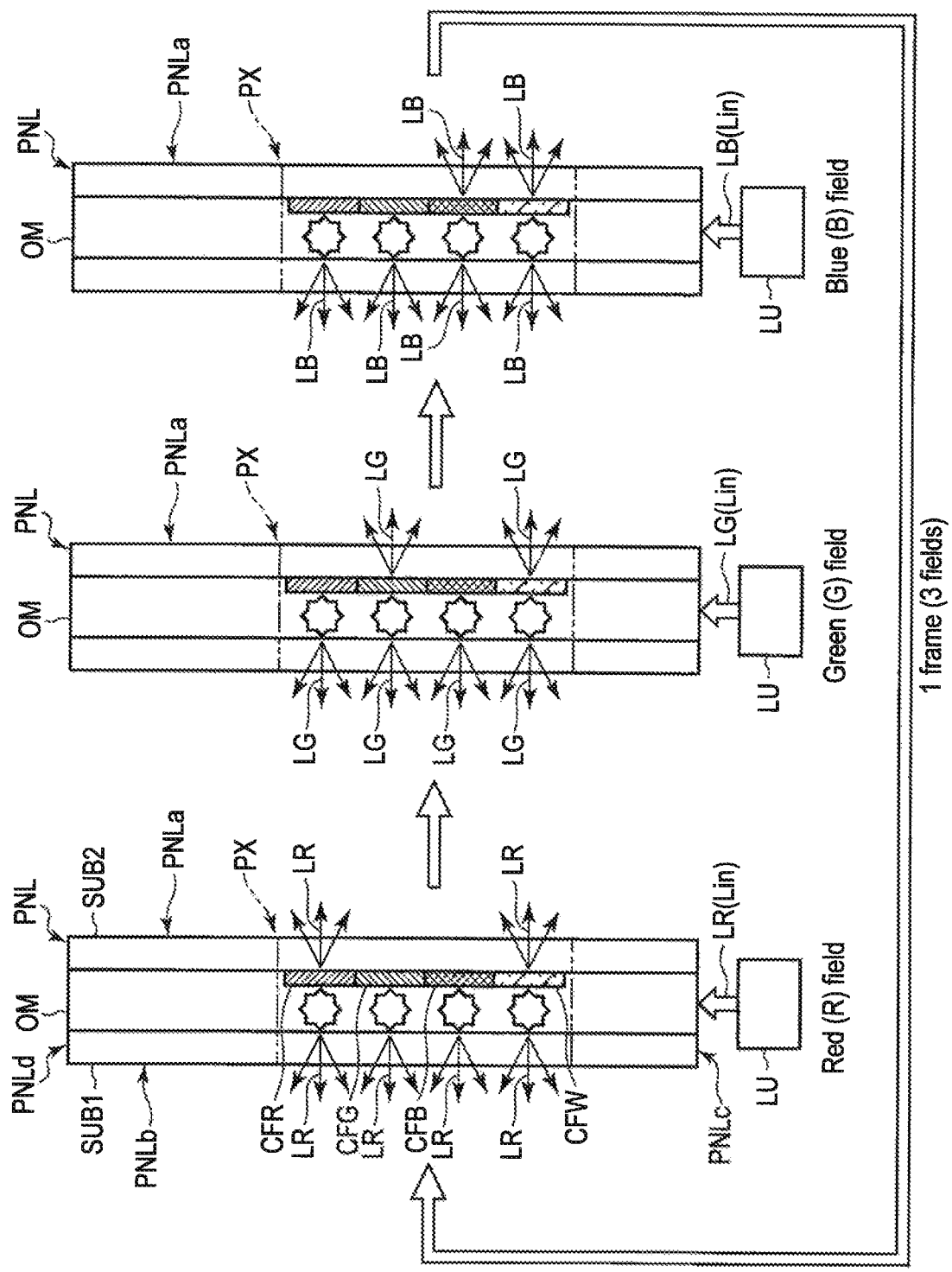
FIG. 32 is a diagram showing a configuration example of a display device DSP of a second embodiment, and its display mode.

FIG. 32 is a diagram showing a configuration example of a display device DSP of a second embodiment, and its display mode.

In the example illustrated, the red color filter CFR, the green color filter CFG and the blue color filter CFB are disposed on the second substrate SUB2 but the colors of the filters are not limited to red, green and blue and may be first to third colors different from each other. In addition, the white color filter CFW is disposed on the second substrate SUB2 but may not be disposed.

Each of main pixels PX is composed of an R pixel in which a red color filter CFR is disposed, a G pixel in which a green color filter CFG is disposed, a B pixel in which a blue color filter CFB is disposed and a W pixel in which a white color filter CFW is disposed. The operations of a light source unit LU in R, G, and B fields are the same as those explained with reference to FIG. 22. Red light LR is emitted from a main surface PNLa since the R pixel and the W pixel are set in the scattering mode, in an R field. At this time, the R pixel and the W pixel emit the red light LR from a main surface PNLb too. In addition, the G pixel and the B pixel can urge the scattered light to be absorbed into the G color filter and the B color filter and emit the red light LR from the main surface PNLb by being set in the scattering mode. Simultaneously, in the G field, the G pixel and the W pixel can emit green light LG from the main surfaces PNLa and PNLb, and the R pixel and the B pixel can emit the green light LG from the main surface PNLb. In addition, in the B field, the B pixel and the W pixel can emit blue light LB from the main surfaces PNLa and PNLb, and the R pixel and the G pixel can emit the blue light LB from the main surface PNLb.

According to the above-described driving method, the display device DSP can differentiate the brightness of the main surface PNLa and the brightness of the main surface PNLb, on the main pixels PX, in each of the fields. Since the display colors in one frame of the main pixels PX are visually recognized as synthesis of the emitted light in each of the fields, the main pixels PX can emit different colors on the main surfaces PNLa and PNLb. In other words, the display device DSP can display different images on the main surfaces PNLa and PNLb.

According to the embodiments, as described above, the display device having the light transmitting property and preventing information from being easily obtained from the rear surface side can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a display panel having a light transmission property, the display panel comprising:
a main surface which displays an image;
a rear surface which is opposite to the main surface;
main pixels each including at least one of a first sub-pixel, a second sub-pixel, a third sub-pixel, and a dummy pixel, the first sub-pixel exhibiting a first color, the second sub-pixel exhibiting a second color, the third sub-pixel exhibiting a third color, and the dummy pixel exhibiting a fourth color having brightness lower than the first color, the second color, and the third color;
a first substrate having a light transmission property and comprising the rear surface;
a second substrate opposed to the first substrate and having a light transmission property, and comprising the main surface;
a first color filter disposed on the first sub-pixel of the second substrate to allow light of the first color to be transmitted;
a second color filter disposed on the second sub-pixel of the second substrate to allow light of the second color to be transmitted;
a third color filter disposed on the third sub-pixel of the second substrate to allow light of the third color to be transmitted;
a fourth color filter disposed on the dummy pixel of the second substrate to allow light of the fourth color to be transmitted; and
a light modulating layer located between the first substrate and the second substrate and capable of changing a light transmission property and a light scattering property of regions corresponding to the first sub-pixel, the second sub-pixel, the third sub-pixel, and the dummy pixel, respectively,
wherein
the first sub-pixel, the second sub-pixel, and the third sub-pixel display from the main surface and the rear surface,
the light modulating layer is in a scattering mode at a position corresponding to the dummy pixel in one of the main pixels when it does not contribute to the display of the image on the main surface,
the dummy pixel displays from the rear surface when not displaying from the main surface, and
the first sub-pixel, the second sub-pixel, and the third sub-pixel display from the main surface and the rear surface when the dummy pixel is displaying from the rear surface and is not displaying from the main surface.

2. The display device of claim 1, wherein
the light modulating layer includes a first region and a second region each having an optical anisotropy and different from each other with respect to optical response to an electric field,
the first region is formed to contain a liquid crystal material, and
the second region is formed to contain a polymeric material.

3. The display device of claim 1, wherein
the display panel comprises:
the second substrate opposed to the light modulating layer;
and the fourth color filter having a transmittance lower than transmittance of the first color filter, the second color filter, and the third color filter.

4. The display device of claim 1, wherein
the fourth color is black.

5. The display device of claim 1, wherein
each of the first color, the second color, and the third color is any one of red, green and blue.

6. The display device of claim 1, wherein
the display panel further comprises:
a fourth sub-pixel exhibiting the first color;
a fifth sub-pixel exhibiting the second color;
a first main pixel which is one of the main pixels composed of the first sub-pixel, the second sub-pixel, and the third sub-pixel; and
a second main pixel which is one of the main pixels composed of the fourth and fifth sub-pixels and the dummy pixel,
wherein the first main pixel and the second main pixel are separate from other main pixels.

7. The display device of claim 1, wherein
the display panel further comprises:
a fourth sub-pixel exhibiting the first color;
a fifth sub-pixel exhibiting the second color;
a sixth sub-pixel exhibiting the third color;
a first main pixel which is one of the main pixels composed of the first sub-pixel, the second sub-pixel, and the third sub-pixel; and
a second main pixel which is one of the main pixels composed of the fourth sub-pixel, the fifth sub-pixel, and the sixth sub-pixel, and
a second dummy pixel is located between the first main pixel and the second main pixel adjacent to each other and separated from the first main pixel and the second main pixel,
wherein the first main pixel and the second main pixel are separate from other main pixels.

8. The display device of claim 7, wherein
the display panel further comprises a seventh sub-pixel and an eighth sub-pixel exhibiting a fifth color having brightness higher than brightness of the first color, the second color, and the third color,
the first main pixel comprises the seventh sub-pixel, and
the second main pixel comprises the eighth sub-pixel.

9. The display device of claim 8, wherein
the fifth color is white.

10. The display device of claim 1, wherein
the display panel further comprises:
a fourth sub-pixel exhibiting the first color;
a fifth sub-pixel exhibiting the second color;
a sixth sub-pixel exhibiting the third color;
a seventh sub-pixel and an eighth sub-pixel exhibiting a fifth color having brightness higher than brightness of the first color, the second color, and the third color;
a first main pixel which is one of the main pixels composed of the first sub-pixel, the second sub-pixel, the third sub-pixel, and the seventh sub-pixel; and
a second main pixel which is one of the main pixels composed of a second dummy pixel and any three sub-pixels of the fourth sub-pixel, the fifth sub-pixel, the sixth sub-pixel, and the eighth sub-pixel,
wherein the first main pixel and the second main pixel are separate from other main pixels.

11. The display device of claim 10, wherein
the second main pixel is composed of the second dummy pixel and the fourth sub-pixel, the fifth sub-pixel, and the sixth sub-pixel.

12. The display device of claim 1, further comprising:
a light source unit illuminating the light modulating layer from an outside of the display panel.

13. The display device of claim 12, wherein
the light source unit comprises at least two light sources emitting light of different colors.

14. The display device of claim 13, wherein
the light source unit comprises a red light source, a green light source, and a blue light source.

15. The display device of claim 12, further comprising a controller changing:
a first display mode of displaying an image by using external light alone;
a second display mode of displaying an image by using the external light and illumination light from the light source unit; and
a third display mode of displaying an image by using the illumination light alone.

16. A display device comprising:
a display panel having a light transmission property,
the display panel comprising:
a first sub-pixel exhibiting a first color;
a second sub-pixel exhibiting a second color;
a third sub-pixel exhibiting a third color;
a dummy pixel exhibiting a fourth color having brightness lower than the first color, the second color, and the third color;
a light modulating layer capable of changing a light transmission property and a light scattering property of regions corresponding to the first sub-pixel, the second sub-pixel, the third sub-pixel, and the dummy pixel, respectively;
a substrate opposed to the light modulating layer and having a light transmission property;
a first color filter disposed on the first sub-pixel of the substrate and allowing light of the first color to be transmitted;
a second color filter disposed on the second sub-pixel of the substrate and allowing light of the second color to be transmitted;
a third color filter disposed on the third sub-pixel of the substrate and allowing light of the third color to be transmitted;
a light absorbing layer disposed on the dummy pixel of the substrate and having a transmittance lower than transmittance of the first color filter, the second color filter, and the third color filter; and
a light reflecting layer between the light absorbing layer and the light modulating layer.

17. A display device comprising:
a display panel having a light transmission property,
the display panel comprising:
a first sub-pixel exhibiting a first color;
a second sub-pixel exhibiting a second color;
a third sub-pixel exhibiting a third color;
a dummy pixel exhibiting a fourth color having brightness lower than the first color, the second color, and the third color; and
a light modulating layer capable of changing a light transmission property and a light scattering property of regions corresponding to the first sub-pixel, the second sub-pixel, the third sub-pixel, and the dummy pixel, respectively;
a light source unit illuminating the light modulating layer from an outside of the display panel;
a controller changing:
a first display mode of displaying an image by using external light alone;
a second display mode of displaying an image by using the external light and illumination light from the light source unit; and
a third display mode of displaying an image by using the illumination light alone,
wherein
the light source unit emits white light in the second display mode, and sequentially emits light of at least two colors in the third display mode.

18. A method of driving a display device,
the display device comprising:
a main surface which displays an image;
a rear surface which is opposite to the main surface;
a first sub-pixel exhibiting a first color;
a second sub-pixel exhibiting a second color;
a third sub-pixel exhibiting a third color;
a dummy pixel exhibiting a fourth color having brightness lower than the first color, the second color, and the third color, a first substrate having a light transmission property;
a second substrate opposed to the first substrate and having a light transmission property;
a first color filter disposed on the first sub-pixel of the second substrate to allow light of the first color to be transmitted;
a second color filter disposed on the second sub-pixel of the second substrate to allow light of the second color to be transmitted;
a third color filter disposed on the third sub-pixel of the second substrate to allow light of the third color to be transmitted;
a fourth color filter disposed on the dummy pixel of the second substrate to allow light of the fourth color to be transmitted;
a light modulating layer located between the first substrate and the second substrate and capable of modulating a transmission mode indicating a light transmission property and a scattering mode indicating a light scattering property; and
a light source unit illuminating the light modulating layer, emitting light of the first color in a first field for driving the first sub-pixel, emitting light of the second color in a second field for driving the second sub-pixel, and emitting light of the third color in a third field for driving the third sub-pixel,
the light source unit illuminating a side surface of a display panel which comprises the first substrate and the second substrate, wherein
the first sub-pixel, the second sub-pixel, and the third sub-pixel display from the main surface and the rear surface,
the dummy pixel displays from the rear surface when not displaying from the main surface, and
the first sub-pixel, the second sub-pixel, and the third sub-pixel display from the main surface and the rear surface when the dummy pixel is displaying from the rear surface and is not displaying from the main surface,
the method comprising:
urging the light of the first color to be emitted from the light source unit, in the first field, and urging the light of the first color to be absorbed into the second and third color filters and the light of the first color to be emitted from the first substrate by setting at least one of the second and third sub-pixels in the scattering mode.

19. A display device comprising:
a display panel having a light transmission property,
the display panel comprising:
  a main surface which displays an image;
  a rear surface which is opposite to the main surface;
  main pixels each including at least one of a first sub-pixel, a second sub-pixel, a third sub-pixel, and a dummy pixel, the main pixels arranged in a first direction and a second direction and spaced apart at an interval of one main pixel,
  the first sub-pixel exhibiting a first color,
  the second sub-pixel exhibiting a second color,
  the third sub-pixel exhibiting a third color, and
  the dummy pixel exhibiting a fourth color having brightness lower than the first color, the second color, and the third color;
  a first substrate having a light transmission property and comprising the rear surface;
  a second substrate opposed to the first substrate and having a light transmission property, and comprising the main surface;
  a first color filter disposed on the first sub-pixel of the second substrate to allow light of the first color to be transmitted;
  a second color filter disposed on the second sub-pixel of the second substrate to allow light of the second color to be transmitted;
  a third color filter disposed on the third sub-pixel of the second substrate to allow light of the third color to be transmitted;
  a fourth color filter disposed on the dummy pixel of the second substrate to allow light of the fourth color to be transmitted;
  a light modulating layer located between the first substrate and the second substrate and capable of changing a light transmission property and a light scattering property of regions corresponding to the first sub-pixel, the second sub-pixel, the third sub-pixel, and the dummy pixel, respectively; and
  transparent regions disposed between the main pixels in which no color filters are arranged and being apart at the interval of one main pixel, wherein
  the first sub-pixel, the second sub-pixel, and the third sub-pixel display from the main surface and the rear surface,
  the dummy pixel displays from the rear surface when not displaying from the main surface, and
  the first sub-pixel, the second sub-pixel, and the third sub-pixel display from the main surface and the rear surface when the dummy pixel is displaying from the rear surface and is not displaying from the main surface.

* * * * *